United States Patent
Sato

(10) Patent No.: US 8,625,143 B2
(45) Date of Patent: Jan. 7, 2014

(54) DECODING DEVICE, METHOD FOR CONTROLLING DECODING DEVICE, AND IMAGE FORMING APPARATUS

(75) Inventor: Ryuichi Sato, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 871 days.

(21) Appl. No.: 12/659,054

(22) Filed: Feb. 24, 2010

(65) Prior Publication Data

US 2010/0225969 A1    Sep. 9, 2010

(30) Foreign Application Priority Data

Mar. 5, 2009  (JP) ................................ 2009-052300
Dec. 1, 2009  (JP) ................................ 2009-273284

(51) Int. Cl.
| | | |
|---|---|---|
| H04N 1/21 | (2006.01) | |
| H04N 1/00 | (2006.01) | |
| G06F 15/00 | (2006.01) | |
| G06F 3/12 | (2006.01) | |
| G06F 11/00 | (2006.01) | |
| H04L 12/28 | (2006.01) | |

(52) U.S. Cl.
USPC .......... 358/1.16; 358/296; 358/1.9; 358/1.15; 358/1.13; 370/235; 370/412; 370/537

(58) Field of Classification Search
USPC .......... 358/448, 1.9, 296, 464, 1.15; 345/604, 345/549, 600
See application file for complete search history.

(56) References Cited

U.S. PATENT DOCUMENTS

| | | | | |
|---|---|---|---|---|
| RE35,657 E | * | 11/1997 | Buckley et al. ................ | 358/296 |
| 5,815,283 A | * | 9/1998 | Watanabe et al. ............. | 358/296 |
| 6,011,590 A | * | 1/2000 | Saukkonen ............... | 375/240.05 |
| 6,429,950 B1 | * | 8/2002 | Ebner ............................ | 358/1.9 |
| 6,674,536 B2 | * | 1/2004 | Long et al. .................... | 358/1.15 |
| 7,580,151 B2 | * | 8/2009 | Kurose et al. .................... | 358/1.9 |
| 7,821,658 B2 | * | 10/2010 | Hyodo et al. ................. | 358/1.15 |
| 2002/0057446 A1 | * | 5/2002 | Long et al. .................... | 358/1.13 |
| 2002/0146023 A1 | * | 10/2002 | Myers .......................... | 370/412 |
| 2003/0103225 A1 | * | 6/2003 | Hyodo et al. ................. | 358/1.13 |
| 2003/0123392 A1 | * | 7/2003 | Ruutu et al. ................... | 370/235 |

FOREIGN PATENT DOCUMENTS

| | | | | |
|---|---|---|---|---|
| JP | 2000177189 A | * | 6/2000 | ................ B41J 5/30 |
| JP | 2005-096343 | | 4/2005 | |
| JP | 3757587 | | 1/2006 | |
| JP | 3797844 | | 4/2006 | |

OTHER PUBLICATIONS

English language abstract of JP 2001-251518, Sep. 14, 2001, Japan.
English language abstract of JP 11-177831, Jul. 2, 1999, Japan.

* cited by examiner

*Primary Examiner* — Akwasi M Sarpong
(74) *Attorney, Agent, or Firm* — Harness, Dickey & Pierce

(57) ABSTRACT

A decoding device checks whether there is free space in each of channel-by-channel buffers, specifies a channel corresponding to a buffer having free space as an input channel for receiving an input of compressed data, analyzes codes of the compressed data received through the input channel, and detects a delimit position in the compressed data on the basis of a result of the analysis. The decoding device expands the compressed data received through the input channel, and sorts the expanded data so as to be stored in the buffer corresponding to the input channel. The decoding device cancels specification of the input channel in accordance with detection of the delimit position, and checks whether there is free space in each of the channel-by-channel buffers, and then specifies a channel corresponding to a buffer having free space as a next input channel.

19 Claims, 14 Drawing Sheets

| No. | TYPE OF CODE | CODE | CODE LENGTH |  | TYPE OF CODE | CODE | CODE LENGTH |
|---|---|---|---|---|---|---|---|
| 1 | CODE CA | 10 | 2 | 12 | CODE CL | 0000101 | 7 |
| 2 | CODE CB | 11 | 2 | 13 | CODE CM | 0000110 | 7 |
| 3 | CODE CC | 010 | 3 | 14 | CODE CN | 0000111 | 7 |
| 4 | CODE CD | 011 | 3 | 15 | CODE CO | 00000001 | 8 |
| 5 | CODE CE | 0010 | 4 | 16 | CODE CP | 00000010 | 8 |
| 6 | CODE CF | 0011 | 4 | 17 | CODE CQ | 00000011 | 8 |
| 7 | CODE CG | 000100 | 6 | 18 | CODE CR | 00000100 | 8 |
| 8 | CODE CH | 000101 | 6 | 19 | CODE CS | 00000101 | 8 |
| 9 | CODE CI | 000110 | 6 | 20 | CODE CT | 00000110 | 8 |
| 10 | CODE CJ | 000111 | 6 | 21 | CODE CU | 00000111 | 8 |
| 11 | CODE CK | 0000100 | 7 | 22 | CODE CV(EOL) | 00000000 | 8 |

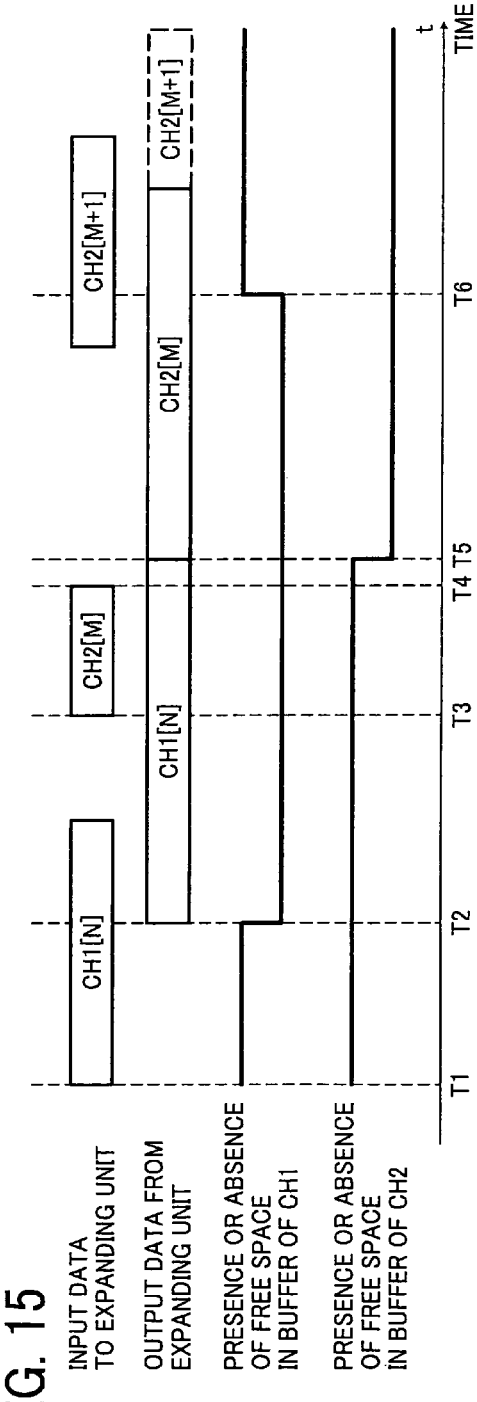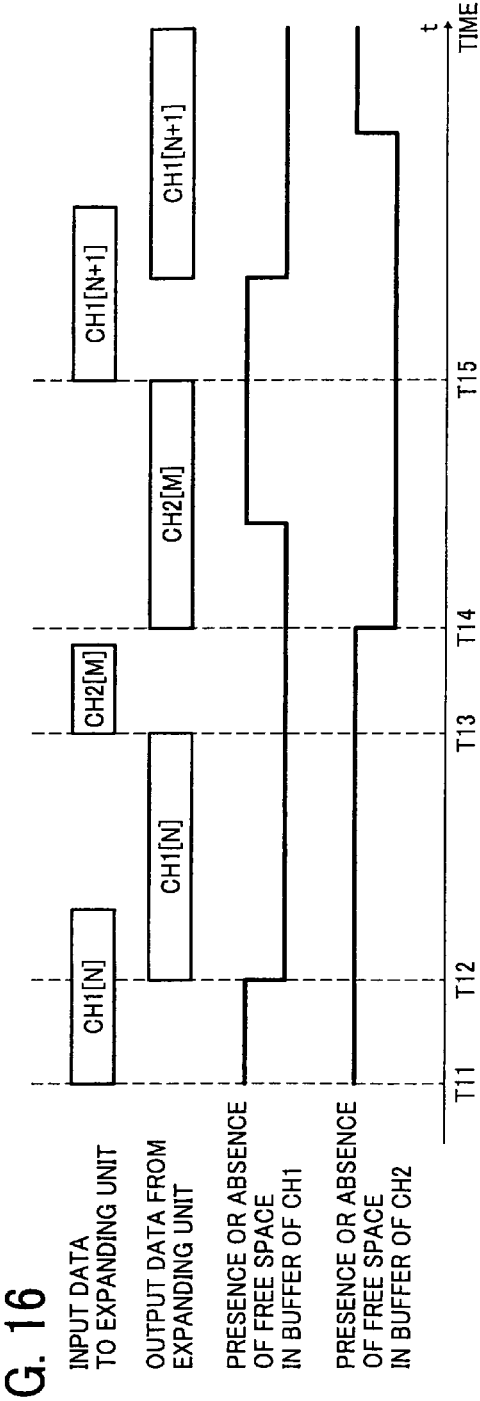

DECODING DEVICE, METHOD FOR CONTROLLING DECODING DEVICE, AND IMAGE FORMING APPARATUS

CROSS-REFERENCE TO RELATED APPLICATIONS

The present application claims priority to and incorporates by reference the entire contents of Japanese Patent Application No. 2009-052300 filed in Japan on Mar. 5, 2009 and Japanese Patent Application No. 2009-273284 filed in Japan on Dec. 1, 2009.

BACKGROUND OF THE INVENTION

1. Field of the Invention

The present invention relates to a decoding device, a method for controlling the decoding device, and an image forming apparatus.

2. Description of the Related Art

Conventionally, an image forming apparatus, such as an ink-jet printer or a laser printer, usually performs a compression process on data for forming an image on a recording medium such as paper (hereinafter, referred to as a "sheet") because the data is tens to hundreds of megabytes in size. Therefore, at the time of image formation, the image forming apparatus needs to sequentially expand the compressed data and output this expanded data to a recording head or the like.

In the case of color printing, compressed data input through multiple channels needs to be expanded with respect to each color. The following are known as conventional technologies for expanding compressed data input through multiple channels in a time-sharing manner: Japanese Patent Application Laid-open No. 2005-96343 and Japanese Patent Application Laid-open No. H11-177831. In the technology disclosed in Japanese Patent Application Laid-open No. 2005-96343, compressed data input through multiple channels is expanded in a time-sharing manner by the use of one expansion unit and channel-specific buffers. In the technology disclosed in Japanese Patent Application Laid-open No. H11-177831, dummy data is added to data before being compressed, and, at the time of expansion, the dummy data is thrown away after being read; thus, large-capacity buffers are not required for synchronizing the time to output expanded data expanded in a time-sharing manner.

However, in the above conventional technologies, it is necessary to provide a large-capacity buffer capable of storing expanded data obtained by expanding compressed data input through the corresponding channel. Furthermore, the addition of dummy data to data before being compressed leads to a decrease in the compression efficiency of the compressed data.

SUMMARY OF THE INVENTION

It is an object of the present invention to at least partially solve the problems in the conventional technology.

According to an aspect of the present invention, there is provided a decoding device that includes a plurality of buffers that are provided to correspond to a plurality of channels and store expanded data on a channel-by-channel basis; a plurality of input units that are provided to correspond to the channels and receive inputs of encoded compressed data on a channel-by-channel basis; a specifying unit configured to check whether there is free space in each of the buffers, and specify a channel corresponding to a buffer having free space as an input channel through which the input unit corresponding to the input channel receives the input of the expanded data; a detecting unit configured to analyze codes of the compressed data received through the input channel, and detect a delimit position in the compressed data on the basis of a result of the analysis; an expanding unit that expands the compressed data received through the input channel; and a sorting unit that sorts expanded data expanded by the expanding unit so as to be stored in the buffer corresponding to the input channel. The specifying unit is further configured to cancel specification of the input channel in accordance with detection of the delimit position, and check whether there is free space in each of the buffers, and then specify a channel corresponding to a buffer having free space as a next input channel.

According to another aspect of the present invention, there is provided a decoding device that includes a plurality of buffers that are provided to correspond to a plurality of channels and store expanded data on a channel-by-channel basis; a plurality of input units that are provided to correspond to the channels and receive inputs of encoded compressed data on a channel-by-channel basis; a specifying unit configured to check whether there is free space in each of the buffers, and specify a channel corresponding to a buffer having free space as an input channel through which the input unit corresponding to the input channel receives the input of the expand data; an expanding unit that expands the compressed data received through the input channel; a counting unit that counts a data length of expanded data expanded by the expanding unit; and a sorting unit that sorts expanded data expanded by the expanding unit so as to be stored in the buffer corresponding to the input channel. The specifying unit is further configured to cancel specification of the input channel when the data length counted by the counting unit is a predetermined data length, and check whether there is free space in each of the buffers, and then specify a channel corresponding to a buffer having free space as a next input channel.

According to still another aspect of the present invention, there is provided a method of controlling a decoding device including a plurality of buffers that are provided to correspond to a plurality of channels and store expanded data on a channel-by-channel basis. The method includes receiving inputs of encoded compressed data on a channel-by-channel basis; checking whether there is free space in each of the buffers to specify a channel corresponding to a buffer having free space as an input channel through which the input unit corresponding to the input channel receives the input of the expanded data; analyzing codes of the compressed data received through the input channel to detect a delimit position in the compressed data on the basis of a result of the analysis; expanding the compressed data received through the input channel; and sorting expanded data expanded at the expanding so as to be stored in the buffer corresponding to the input channel. At the specifying, specification of the input channel is cancelled in accordance with detection of the delimit position, and whether there is free space in each of the buffers is checked, and then a channel corresponding to a buffer having free space is specified as a next input channel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a diagram showing an example of a timing chart of the expanding unit;

FIG. 16 is a diagram showing another example of the timing chart of the expanding unit;

DETAILED DESCRIPTION OF THE PREFERRED EMBODIMENTS

Exemplary embodiments of an image forming apparatus according to the present invention are explained in detail below with reference to the accompanying drawings.

First Embodiment

Figure 1:
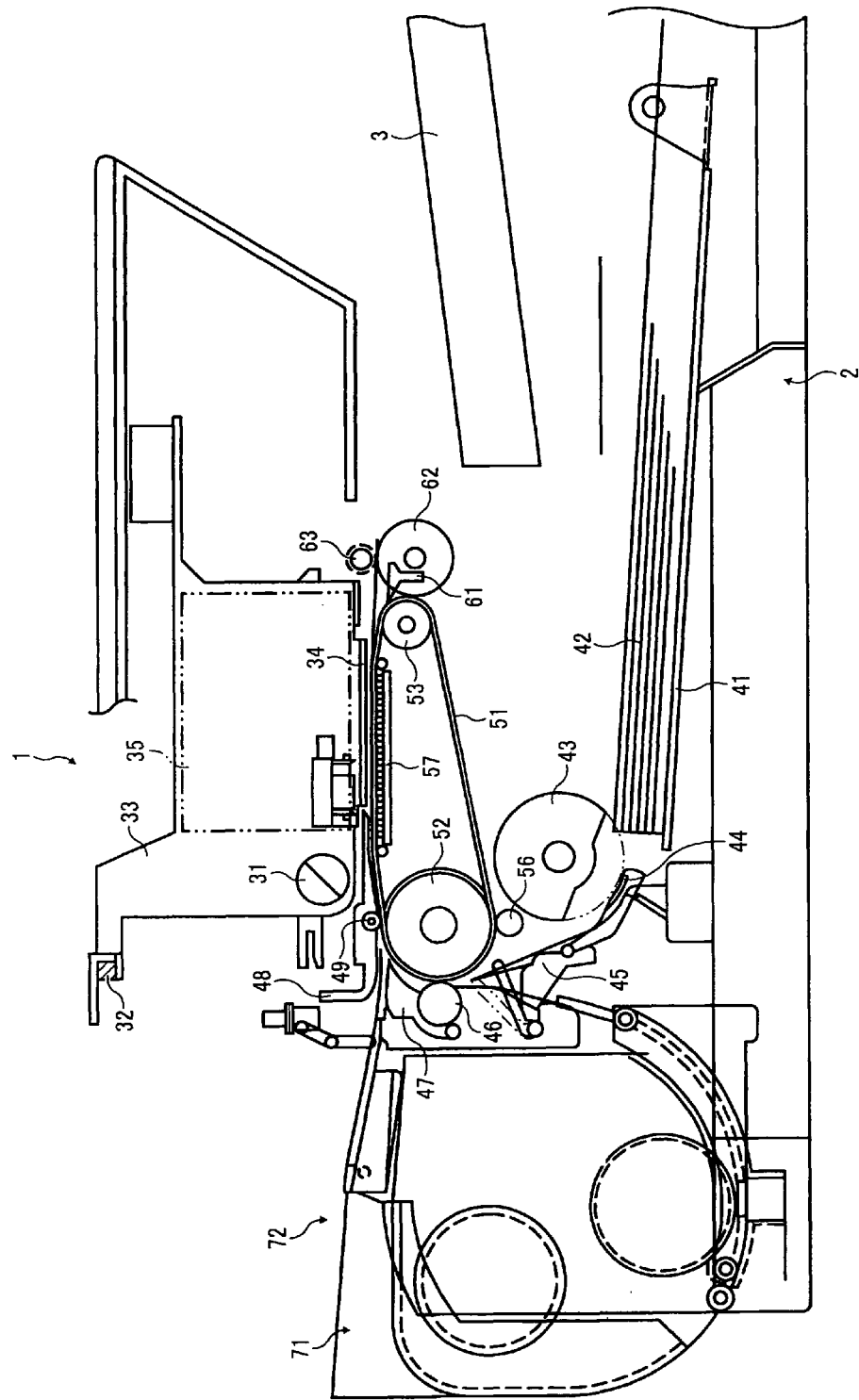
FIG. 1 is a schematic side view for explaining the entire configuration of a mechanical part of an image forming apparatus according to a first embodiment.
Figure 2:
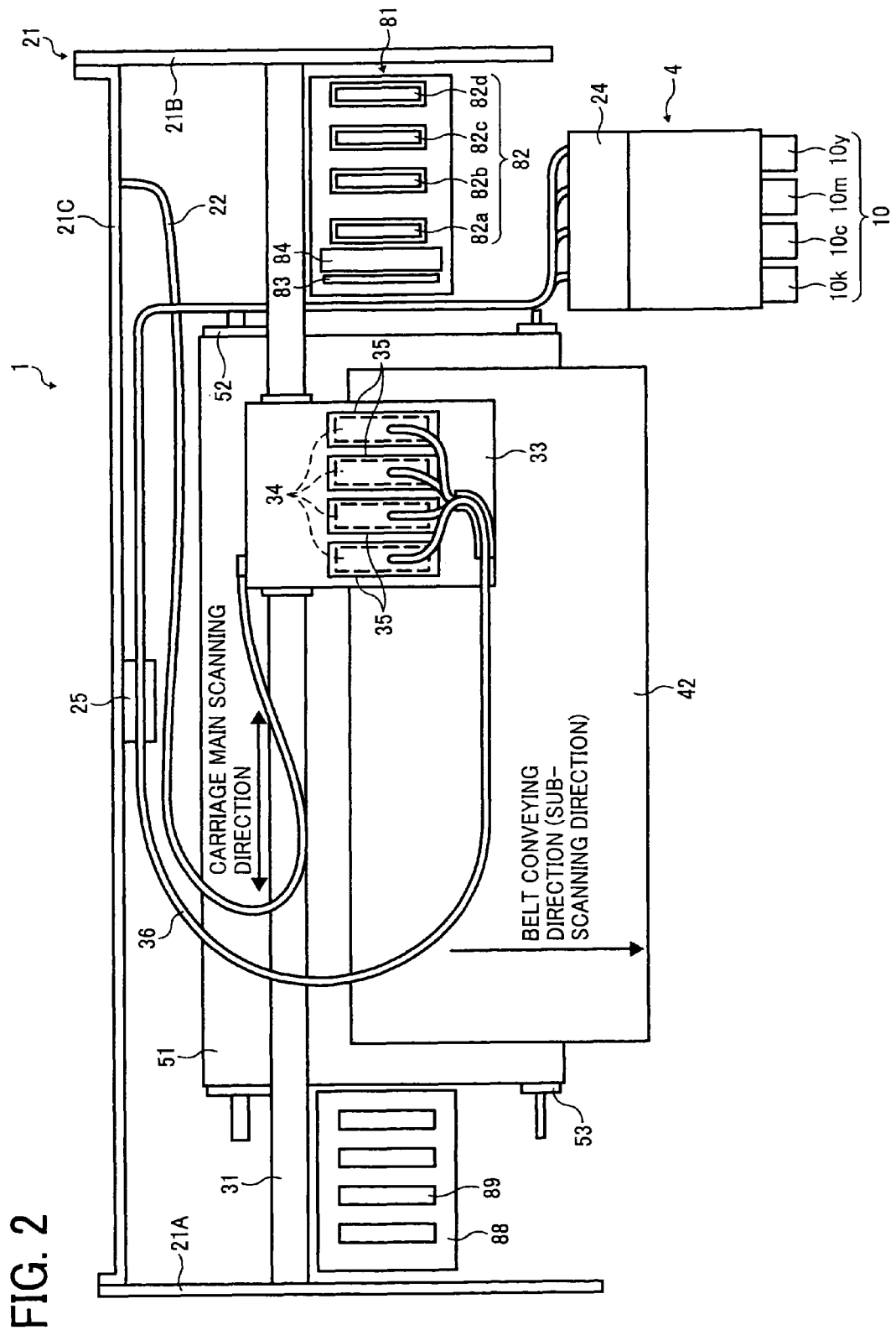
FIG. 2 is a schematic plan view for explaining the entire configuration of the image forming apparatus according to the first embodiment.
Figure 3:
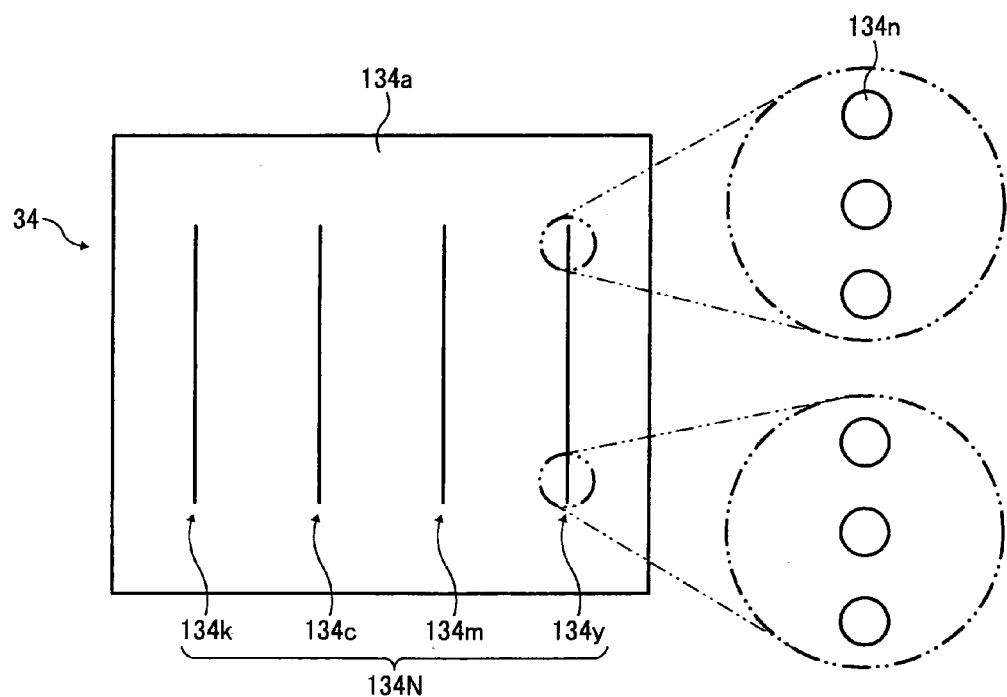
FIG. 3 is a diagram illustrating a nozzle face of a recording head according to the first embodiment.

FIG. 1 is a schematic side view for explaining the entire configuration of a mechanical part of an image forming apparatus 1 according to a first embodiment, and FIG. 2 is a schematic plan view for explaining the entire configuration of the image forming apparatus 1 according to the first embodiment. FIG. 3 is a diagram illustrating a nozzle face of a recording head 34. First, the mechanical part of the image forming apparatus 1 is explained with reference to FIGS. 1 to 3.

As shown in FIGS. 1 and 2, the image forming apparatus 1 holds a carriage 33 with a guide rod 31, which is a guide member laterally lying between right and left side plates 21A and 21B making up a frame 21, and a stay 32 so that the carriage 33 can slide in a main scanning direction. The carriage 33 scans while moving in a direction of arrow shown in FIG. 2 (a carriage main-scanning direction) via a timing belt (not shown) driven by a main-scanning motor (not shown).

The carriage 33 is provided with the recording head 34 made up of four droplet discharge heads for discharging droplets of ink in yellow (Y), cyan (C), magenta (M), and black (Bk), respectively, so that a plurality of ink discharge openings (hereinafter, referred to as "nozzles") are arranged in a direction of crossing the main scanning direction and a direction of discharging droplets of ink is directed downward.

Specifically, as shown in FIG. 3, a nozzle face 134a of the recording head 34 on which a plurality of nozzles 134n are formed is directed downward. On the nozzle face 134a, four lines of nozzles 134k, 134c, 134m, and 134y (hereinafter, referred to as a "nozzle line 134N" unless otherwise distinguished), which are each made up of a plurality of the nozzles 134n, are formed.

As an ink jet head making up the recording head 34, ones including a piezoelectric actuator such as a piezoelectric element, a thermal actuator using a change of phase due to film boiling of liquid using an electrothermal conversion element such as a heat element, a shape-memory-alloy actuator using a change of metallic phase due to temperature change, an electrostatic actuator using an electrostatic force, and the like as a pressure generating means for generating pressure for discharging droplets of ink can be used.

In the present embodiment, all the nozzles can be driven at the same time, and the nozzles can be driven in a time-sharing manner. When all the nozzles are driven at the same time, it may create disadvantages, such as a decrease in recording quality due to the influence of crosstalk between the nozzles or a high-capacity power source because high current is temporarily required; however, the disadvantages can be avoided by driving the nozzles in a time-sharing manner.

The recording head 34 is equipped with a driver IC (not shown). The driver IC controls the generation of pressure for discharging droplets of ink. The driver IC is connected to a printer controller (to be described in detail later) via a harness (a flexible printed cable) 22.

The carriage 33 is equipped with sub-tanks 35 for supplying Y, C, M, and Bk color ink, respectively, to the recording head 34. The sub-tanks 35 are each supplemented/supplied with respective color ink from corresponding ink cartridges 10 (specifically, ink cartridges 10k, 10c, 10m, and 10y) mounted on a cartridge loading unit 4 via respective color ink supply tubes 36. Incidentally, the cartridge loading unit 4 is provided with a supply pump unit 24 for feeding ink into the ink cartridges 10. Furthermore, the ink supply tubes 36 are held on a back plate 21C making up the frame 21 with a locking member 25 in the middle of installation.

As shown in FIG. 1, the image forming apparatus 1 includes, as a sheet feed unit for feeding sheets 42 stacked on a sheet stack unit (a pressure plate) 41 of a sheet feed tray 2, a half-moon roller (a sheet feed roller) 43, which feeds the sheet 42 one by one from the sheet stack unit 41 by separating the sheets 42 from one another, and a separation pad 44, which is opposed to the sheet feed roller 43 and made of a material having a high friction coefficient; the separation pad 44 is biased on the side of the sheet feed roller 43. Incidentally, the sheet 42 is a recording medium for forming an image thereon, and a type of the sheet 42 is not specifically limited; for example, any of recycled paper, high-quality paper, plain paper, a postcard, an envelope, heavy paper, an OHP sheet, and the like can be used as the sheet 42.

To feed the sheet 42 fed from the sheet feed unit to the lower side of the recording head 34, the image forming apparatus 1 includes a guide member 45 for guiding the sheet 42, a counter roller 46, a conveyance guide member 47, and a pressing member 48 having a leading-end pressure roller 49; furthermore, the image forming apparatus 1 includes a conveyance belt 51 as a conveyance means for conveying the fed sheet 42 to the position opposed to the recording head 34 while attracting the sheet 42 thereto by a force of electrostatic attraction.

The conveyance belt 51 is an endless belt, and is configured to be hung between a conveyance roller 52 and a tension roller 53 to endlessly move in a belt conveying direction (a sub-scanning direction). The conveyance belt 51 has a surface layer on the sheet attraction side and a back layer (a medium-resistive layer, a ground layer); the surface layer is formed of, for example, a pure resin material that is not subjected to resistance control and has a thickness of about 40 μm, such as an ETFE pure material; the back layer is formed of the same material as the surface layer and subjected to resistance control using carbon.

Then, the image forming apparatus 1 includes a charging roller 56 as a charging means for charging the surface of the conveyance belt 51. The charging roller 56 is arranged to come in contact with the surface layer of the conveyance belt 51 so as to rotate in accordance with the movement of the conveyance belt 51, and a predetermined pressing force as a pressure force is applied to both ends of a shaft of the charging roller 56. Incidentally, the conveyance roller 52 also serves as a ground roller, and is arranged to come in contact with the medium-resistive layer (the back layer) of the conveyance belt 51 so as to be grounded.

On the underside of the conveyance belt 51, a guide member 57 is arranged so as to correspond to a printing area of the recording head 34. Since the guide member 57 is provided so that a top surface of which projects from the tangent of two rollers supporting the conveyance belt 51 (the conveyance roller 52 and the tension roller 53) to the side of the recording head 34, the highly-accurate flatness of the conveyance belt 51 is maintained.

The conveyance roller 52 is driven to rotate by a sub-scanning motor (not shown), which leads the conveyance belt 51 to move in the belt conveying direction (the sub-scanning direction) shown in FIG. 2.

The image forming apparatus 1 includes, as a sheet discharge unit for discharging the sheet 42 recorded by the recording head 34, a separation claw 61 for separating the sheet 42 from the conveyance belt 51 and sheet discharge rollers 62 and 63, and includes a copy receiving tray 3 below the sheet discharge roller 62. The height of the copy receiving tray 3 is set to keep some distance from the position between the sheet discharge rollers 62 and 63 so that a volume of sheets stacked on the copy receiving tray 3 is ensured.

A duplex unit 71 is removably attached to the back side of the image forming apparatus 1. The duplex unit 71 takes therein the sheet 42 turned back by reverse movement of the conveyance belt 51 to invert the sheet 42, and again feeds the inverted sheet 42 to between the counter roller 46 and the conveyance belt 51. A top surface of the duplex unit 71 serves as a manual sheet feed tray 72.

As shown in FIG. 2, on the one side of a non-printing area in a scanning direction of the carriage 33, a maintenance/restoration mechanism 81 including a restoration means for maintaining and restoring a state of the nozzles of the recording head 34 is arranged. The maintenance/restoration mechanism 81 is provided with cap members (hereinafter, referred to as "caps") 82a to 82d (referred to as a "cap 82" unless otherwise distinguished) for capping the nozzle face of the recording head 34, a wiper blade 83 which is a blade member for wiping the nozzle face, a preliminary discharge receiver 84 for receiving droplets of ink at the time of preliminary discharge in which droplets of ink that do not contribute to recording are discharged so as to discharge ink having increased viscosity. Here, the cap 82a is used as a cap for suction and humidity retention, and the other caps are used as caps for humidity retention.

Ink drainage generated by maintenance/restoration operation by the maintenance/restoration mechanism 81, ink discharged to the cap 82, ink that is attached to the wiper blade 83 and removed by a wiper cleaner, or ink preliminarily discharged into the preliminary discharge receiver 84 is discharged and kept in a drainage tank (not shown).

Furthermore, as shown in FIG. 2, on the other side of the non-printing area in the scanning direction of the carriage 33, a preliminary discharge receiver 88 for receiving droplets of ink at the time of preliminary discharge in which droplets of ink that do not contribute to recording are discharged so as to discharge ink that increases in viscosity during the recording or the like is arranged; the preliminary discharge receiver 88 is provided with apertures 89, which are aligned along the nozzle line of the recording head 34, and the like.

On the back side of inside the image forming apparatus 1, a communication circuit unit (an interface), such as a USB, for transmitting and receiving data between the image forming apparatus 1 and a host is provided, and a control circuit board making up the printer controller that controls the entire image forming apparatus is also provided.

In the image forming apparatus 1 configured as described above, the sheet 42 is fed from the sheet feed tray 2 one by one by separating the sheets 42 from one another; the sheet 42 fed substantially vertically upward is guided by the guide member 45, and conveyed while being sandwiched between the conveyance belt 51 and the counter roller 46. Then, the leading end of the conveyed sheet 42 is guided by the conveyance guide member 47, and pressed against the conveyance belt 51 by the leading-end pressure roller 49, and the conveying direction of the sheet 42 is changed by about 90°.

At this time, the printer controller controls an AC bias supply unit to repeat a positive output and a negative output alternately, i.e., to apply an alternating voltage to the charging roller 56, and the conveyance belt 51 is charged in an alternating charged voltage pattern, i.e., charged with a positive current and a negative current alternately in a certain width in the sub-scanning direction, i.e., the moving direction like a band. When the sheet 42 is fed onto the conveyance belt 51 charged with the positive current and negative current alternately, the sheet 42 is attracted to the conveyance belt 51, and conveyed in the sub-scanning direction in accordance with the movement of the conveyance belt 51.

While moving the carriage 33, the recording head 34 is driven depending on an image signal, and discharges droplets of ink to the sheet 42 being at a stop and records an image for one line on the sheet 42; after the sheet 42 is conveyed for a predetermined distance, recording of an image for a next line is performed. When receipt of a recording complete signal or a signal indicating that the trailing end of the sheet 42 reaches a recording area, the recording operation is terminated, and the sheet 42 is discharged onto the copy receiving tray 3.

While waiting for printing (recording), the carriage 33 is moved to the side of the maintenance/restoration mechanism 81, and the recording head 34 is capped by the cap 82 to keep the nozzles in a moist condition; thus, a discharge trouble due to the dryness of ink is prevented. Furthermore, a restoration operation to discharge ink that increases in viscosity and air bubbles is performed in such a manner that ink is suctioned from the nozzles by a suction pump (not shown) (referred to as "nozzle suctioning" or "head suctioning") in a state where the recording head 34 is capped by the cap 82. Moreover, a preliminary discharge operation to discharge ink that is not related to the recording is performed before the start of recording and during the recording or the like. By this operation, the consistent discharge performance of the recording head 34 is maintained.

Figure 4:
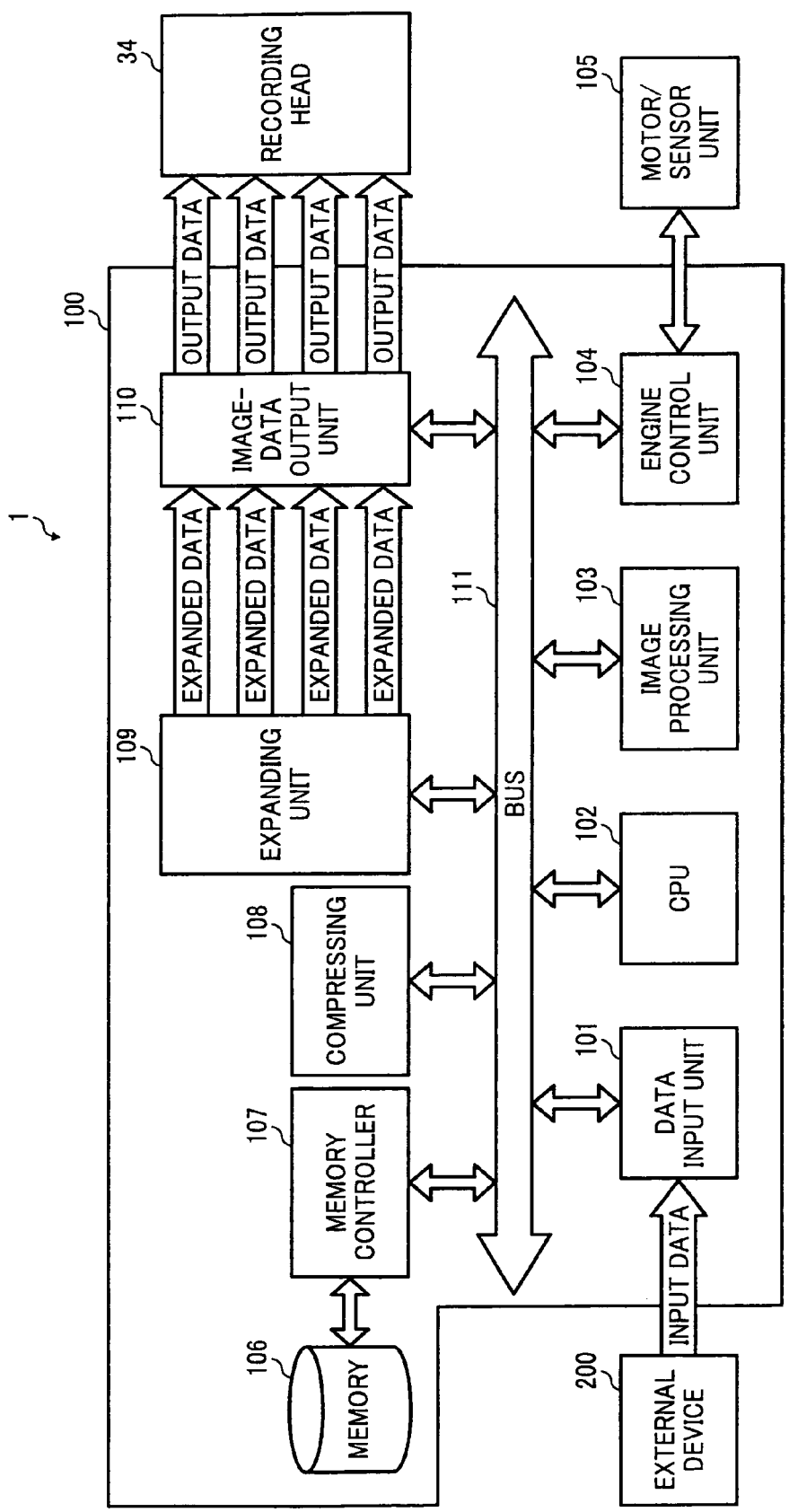
FIG. 4 is a block diagram schematically illustrating a functional configuration of the image forming apparatus according to the first embodiment.

Subsequently, a functional configuration of the image forming apparatus 1 is explained with reference to FIG. 4. FIG. 4 is a block diagram schematically illustrating the functional configuration of the image forming apparatus 1.

As shown in FIG. 4, the image forming apparatus 1 includes a printer controller 100, which controls the overall operation of the image forming apparatus 1, and a motor/sensor unit 105, which performs the driving of the recording head 34 and the conveyance of the sheet 42 as described above and also performs the position detection and the like. The printer controller 100 includes a data input unit 101, a CPU 102, an image processing unit 103, an engine control unit 104, a memory 106, a memory controller 107, a compressing unit 108, an expanding unit 109, and an image-data output unit 110. In the printer controller 100, the above units are connected to one another via a bus 111.

The data input unit 101 is an interface for receiving input data from an external device 200, such as a PC (Personal Computer), under the control of the CPU 102. Specifically, the data input unit 101 can be a USB (Universal Serial Bus), a Centronics interface, the IEEE (Institute of Electrical and Electronic Engineers) 1284, an Ethernet (trademark) interface, or the like.

The CPU 102 (Central Processing Unit) centrally controls the operation of the image forming apparatus 1. Specifically, the CPU 102 develops programs stored in a ROM (Read Only Memory) or the like in a RAM (Random Access Memory) or a work area of the memory 106, and sequentially executes the programs thereby outputting control signals to the units of the image forming apparatus 1.

The image processing unit 103 performs predetermined image processing on input image data under the control of the CPU 102. Specifically, the image processing unit 103 performs image transformation, such as rotation or enlargement/reduction, and color conversion from RGB (red, green, blue) to CMYK (cyan, magenta, yellow, black) (or vice versa) by reference to a color profile or the like.

Furthermore, the image processing unit 103 converts print data written in printer language (for example, page-description language (PDL), PCL, PostScript (PS), etc.) into directly-printable raster data. The raster data converted by the image processing unit 103 is subjected to data compression by being encoded by the compressing unit 108, and then stored in the memory 106. For example, when data input from the external device 200 or the like is print data, the print data is converted into raster data by the image processing unit 103, and encoded by the compressing unit 108, and then stored in the memory 106.

The engine control unit 104 outputs a control signal to the motor/sensor unit 105 under the control of the CPU 102, thereby controlling the driving of the recording head 34 or the conveyance of the sheet 42.

The memory 106 is an HDD (Hard Disk Drive), a semiconductor memory, or the like, and stores therein predetermined data under the control of the memory controller 107. As data stored in the memory 106, there are data input from the external device 200 (print data), data compressed by being encoded by the compressing unit 108, and the like. A portion of a storage area of the memory 106 can be used as a work area of the CPU 102. The memory controller 107 performs storage of data in the memory 106 and readout of data stored in the memory 106 under the control of the CPU 102.

The compressing unit 108 encodes the input raster data for the respective colors (C, M, Y, and Bk) by a predetermined encoding method under the control of the CPU 102, thereby compressing the raster data. The compressed data for each color is stored in the memory 106. Under the control of the CPU 102, the expanding unit 109 sequentially reads out the compressed data for each color stored in the memory 106, and expands the compressed data in a time-sharing manner, and then outputs the expanded data to the image-data output unit 110.

Under the control of the CPU 102, the image-data output unit 110 processes the raster data input from the expanding unit 109 as needed, for example, rearranges the order of the data in accordance with the driving of the recording head 34, and then outputs the data to the recording head 34. As described above, after compressed data for each color stored in the memory 106 is expanded in a time-sharing manner by the expanding unit 109, the expanded data is output to the recording head 34 via the image-data output unit 110 without being again written on the memory 106 (i.e., on-the-fly).

Figure 5:
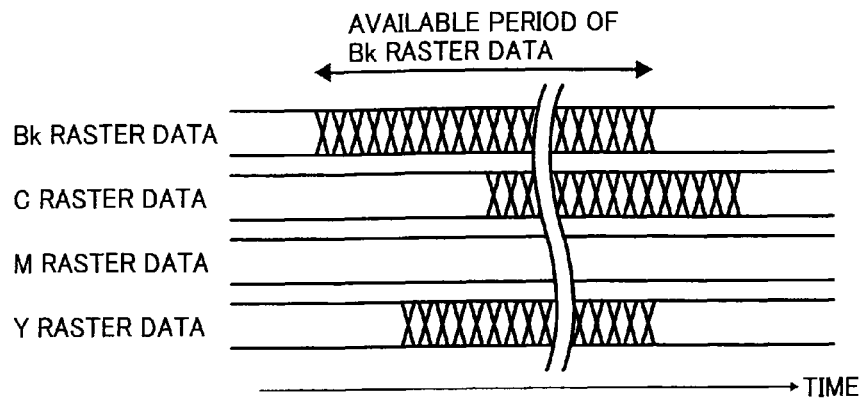
FIG. 5 is a timing chart showing an available period of data for respective colors to be output to the recording head.

FIG. 5 is a timing chart showing an available period of data (raster data) for each color to be output to the recording head 34. As described above, the nozzle lines of the recording head 34 differ in physical location on the nozzle face 134a from one another. Therefore, to discharge droplets of ink to the same position on the sheet, it is necessary to vary output timing among raster data as shown in FIG. 5 under the control of the CPU 102. Furthermore, an effective area on the sheet may be different by color, and also ink in specific color (magenta in a case of the chart) may be not used depending on an image to be formed. In such cases, data transfer is not performed. Thus, timings at which the expanding unit 109 shown in FIG. 4 expands the data with respect to each color are not the same, and also the data is not always expanded with respect to all the four colors.

Figure 6:
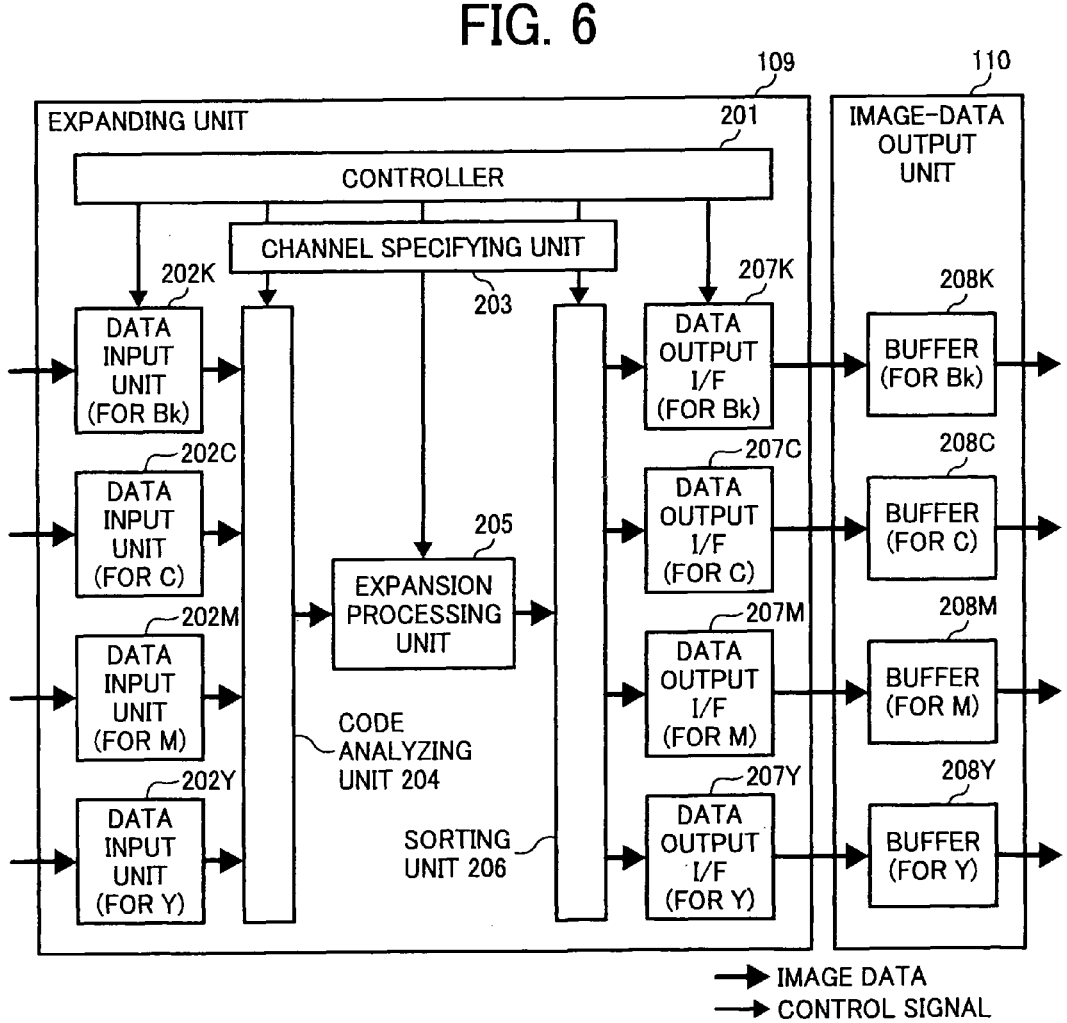
FIG. 6 is a block diagram schematically illustrating internal configurations of an expanding unit and an image-data output unit.

Here, the expanding unit 109 and the image-data output unit 110 are explained in detail. FIG. 6 is a block diagram schematically illustrating internal configurations of the expanding unit 109 and the image-data output unit 110. As shown in FIG. 6, the expanding unit 109 includes a controller 201, data input units 202K, 202C, 202M, and 202Y, a channel specifying unit 203, a code analyzing unit 204, an expansion processing unit 205, a sorting unit 206, and data output I/Fs 207K, 207C, 207M, and 207Y. The image-data output unit 110 includes buffers 208K, 208C, 208M, and 208Y.

The controller 201 controls the operation of each unit in the expanding unit 109 under the control of the CPU 102. The data input units 202K, 202C, 202M, and 202Y read out compressed data for their respective colors (Bk, C, M, and Y) from the memory 106, and input the read compressed data to the code analyzing unit 204. Specifically, the data input unit 202K inputs compressed Bk-color image data to the code analyzing unit 204; the data input unit 202C inputs compressed C-color image data to the code analyzing unit 204; the data input unit 202M inputs compressed M-color image data to the code analyzing unit 204; the data input unit 202Y inputs compressed Y-color image data to the code analyzing unit 204.

The channel specifying unit 203 specifies a channel (an input channel) through which the code analyzing unit 204 receives data from any of the data input units 202K, 202C, 202M, and 202Y and a channel (an output channel) through which the sorting unit 206 outputs data to any of the data output I/Fs 207K, 207C, 207M, and 207Y after the expansion processing unit 205 expands the data on the basis of a result of analysis of compressed data by the code analyzing unit 204.

The code analyzing unit 204 analyzes compressed data input from the data input units 202K, 202C, 202M, and 202Y, and detects a delimit position in the compressed data (the detection of delimit position will be described in detail later), and then outputs a result of the detection as a result of analysis to the channel specifying unit 203. Furthermore, the code analyzing unit 204 inputs compressed data with respect to the channel (i.e., color) specified by the channel specifying unit 203 from the data input units 202K, 202C, 202M, and 202Y to the expansion processing unit 205. The expansion processing unit 205 expands the received compressed data, and inputs the expanded data to the sorting unit 206.

The sorting unit 206 inputs the expanded data received from the expansion processing unit 205 to the channel (color) specified from the data output I/Fs 207K, 207C, 207M, and 207Y by the channel specifying unit 203. The data output I/Fs 207K, 207C, 207M, and 207Y store the expanded data for respective colors in the buffers 208K, 208C, 208M, and 208Y, respectively.

Specifically, the data output I/F 207K stores expanded Bk-color image data in the buffer 208K; the data output I/F 207C stores expanded C-color image data in the buffer 208C; the data output I/F 207M stores expanded M-color image data in the buffer 208M; the data output I/F 207Y stores expanded Y-color image data in the buffer 208Y. The buffers 208K, 208C, 208M, and 208Y each output the stored data to the recording head 34 at a predetermined timing under the control of the CPU 102.

Conventionally, to expand compressed data with respect to the respective colors (C, M, Y, and Bk) whose output timings are different from one another as shown in FIG. 5 at the same time, i.e., to expand compressed data input from the four channels, it is necessary to provide configurations for performing the expansion process corresponding to the number of input channels. Furthermore, when the compressed data input from the channels is sequentially expanded in a time-sharing manner, it is necessary to provide a large-capacity buffer for absorbing the difference in output timing of the data after being subjected to the expansion to a subsequent stage.

In the present embodiment, as shown in FIG. 6, the expanding unit 109 includes the channel specifying unit 203, the code analyzing unit 204, and the sorting unit 206. The above units in the expanding unit 109 perform respective processes to be described later, which causes the single expansion processing unit 205 to sequentially expand the compressed data input from the channels in a time-sharing manner. Thus, each of the buffers 208K, 208C, 208M, and 208Y of the image-data output unit 110 just has to be a buffer capable of storing data in size larger than the unit size of time-sharing expansion, and each of the channels need not to be provided with a large-capacity buffer capable of storing expanded data that all the compressed data is expanded.

Furthermore, the buffers 208K, 208C, 208M, and 208Y of the image-data output unit 110 can be used for the following applications. Expanded data (raster data) obtained by expanding compressed data stored in the memory 106 is data of pixels aligned in the main scanning direction. On the other hand, the nozzles in the recording head 34 are aligned in the sub-scanning direction, so it is necessary to perform a process for rotating the raster data. To implement the rotation process by the CPU 102, it is necessary to perform bitwise operation, so a processing load of the CPU 102 increases. Thus, in the image-data output unit 110, the expansion processing unit 205 performs the rotation process for each certain amount of the raster data. The buffers 208K, 208C, 208M, and 208Y are used as a work area of the rotation process.

For example, when the number of nozzles in the recording head 34 is 256, and the rotation process is performed every 32 bits, the size of data that the buffers 208K, 208C, 208M, and 208Y can store therein is 256×32 =8192 (bits). To output data while storing the data in the buffers 208K, 208C, 208M, and 208Y, a buffer capable of storing data corresponding to two nozzle faces is to be provided.

When the data size of two nozzle faces is larger than the unit size of time-sharing expansion by the expansion processing unit 205, even if compressed data input from the channels is, sequentially expanded by the single expansion processing unit 205 in a time-sharing manner, there is no need to add a new buffer. Therefore, the unit size of time-sharing expansion by the expansion processing unit 205 is preferably the same as the two nozzle faces of the recording head 34, which is required to output expanded data to the recording head 34 while storing the data in the buffers 208K, 208C, 208M, and 208Y, or smaller than the two nozzle faces of the recording head 34.

In this manner, when a buffer is used as a buffer for storing expanded data expanded by the expanding unit 109 and a buffer for the recording head 34 to form an image in the main scanning direction, there is no need to add a new buffer.

Figures 7, 8:
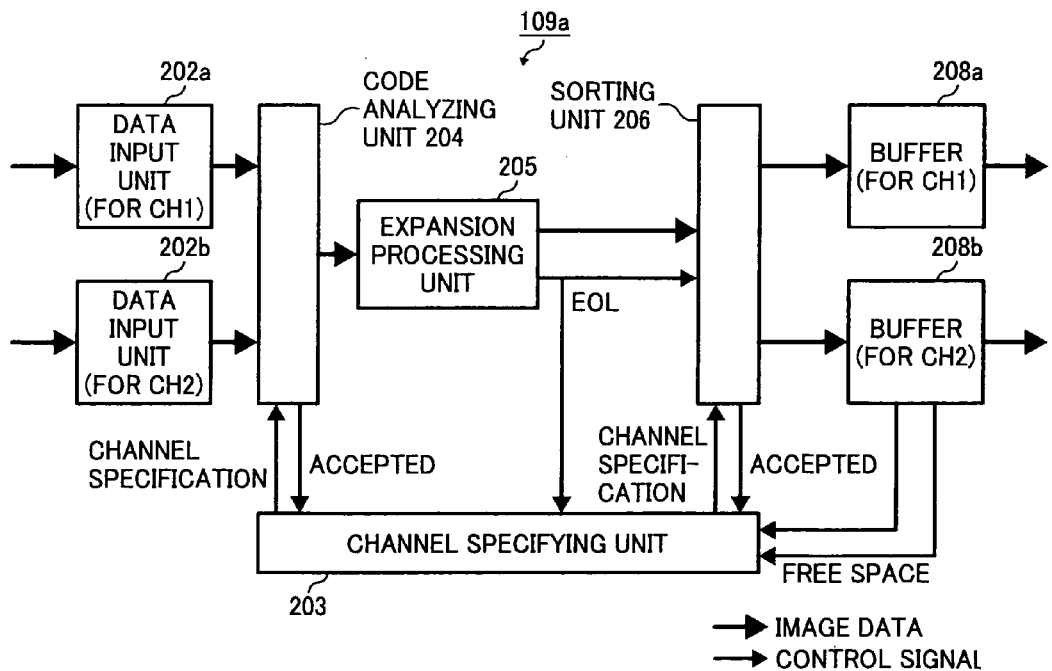
FIG. 7 is a diagram showing a virtual code correspondence table.
FIG. 8 is a block diagram illustrating the simplified internal configuration of the expanding unit.

Here, an encoding method used upon encoding by the compressing unit 108 and expansion by the expansion processing unit 205 of the expanding unit 109 is explained with reference to FIG. 7. FIG. 7 is a diagram showing a virtual code correspondence table.

In data compression by the encoding method, for example, fixed-length data (code) before being compressed is converted on the basis of the code table in which a code of which the appearance ratio is high in data before being compressed is assigned to a code of which the code length is short, thereby reducing the data size. Specifically, as shown in FIG. 7, data compression/expansion is performed on the basis of the code correspondence table in which codes CA to CV are arranged in descending order of appearance ratio in data before being compressed and codes corresponding to the codes CA to CV in the data after being compressed are arranged in ascending order of code length (ranging from a code of 2 in code length to a code of 8 in code length).

The code CV (EOL: End Of Line) here indicates a delimit position of one block (unit of compression), and specifically is an end code indicating the end of the delimited data. It will be assumed that codes of blocks before and after the code CV are not associated with each other. Therefore, this compression method can expand block by block independently. Incidentally, a signal that the code CV (the EOL code) is expanded (corresponding to "00000000" in an example of FIG. 7) is an end signal (an EOL signal).

For example, in a case of "code CA→code CN→code CD→code CV (EOL)", a data length before compression is 8×4=32 bits. When the data is compressed on the basis of the code correspondence table illustrated in FIG. 7, compressed data stored in the memory 106 is "10000011101100000000", and a data length after the compression is 2+7+3+8=20 bits. At the time of expansion of this compressed data, the expansion processing unit 205 isolates the compressed data by the following steps on the basis of the code correspondence table in FIG. 7.

Step 1-1: Analyze an n-th code (implement comparison with all 22 codes).
Step 1-2: Identify a type and a code length of the n-th code.
Step 1-3: Perform a process corresponding to the identified type of code, and execute an expansion process.
Step 1-4: Identify the start position of an (n+1)-th code.
Step 1-5: Return to step 1-1 (replace n with n+1).

However, when it is intended only to detect a specific code, the above steps are not always have to be taken. For example, in a case of compressed data compressed on the basis of the code correspondence table in FIG. 7, when one wants to detect the position of the code CV (EOL) and to detect a subsequent position, the one just takes the following steps.

Step 2-1: Analyze an n-th code, and identify a code length ("*" can be either 1 or 0).

High-order bit of code is "1*": Code length of 2
High-order bit of code is "01*": Code length of 3
High-order bit of code is "001*": Code length of 4
High-order bit of code is "0001*": Code length of 6
High-order bit of code is "00001*": Code length of 7
High-order bit of code is "000001*": Code length of 8

Step 2-2: Identify the start position of an (n+1)-th code.

Step 2-3: Terminate the process if an n-th code is the code CV (EOL); return to step 2-1 if the n-th code is a code other than the code CV (EOL) (replace n with n+1).

As is obvious from the comparison between steps 1-1 to 1-5 and steps 2-1 to 2-3, a processing load is smaller when it is intended only to detect a specific code.

Incidentally, the code correspondence table illustrated in FIG. 7 shows an example of detecting code lengths simply. Depending on a compression method, it may be not possible to detect a code length so simply like the example; however, that doesn't change the fact that a processing load is smaller when it is intended only to detect a specific code.

Furthermore, the correspondence of the code correspondence table may change depending on a status of compressed data. Thus, the code analyzing unit 204 performs a process required to detect a code length before compressed data is input to the expansion processing unit 205. For example, in a compression method used in a facsimile machine or the like, a code correspondence table corresponding to black data is different from a code correspondence table corresponding to white data. Therefore, the code analyzing unit 204 detects whether compressed data to be processed is black data or white data, and notifies the expansion processing unit 205 of a result of the detection.

Subsequently, the operations of the units in the expanding unit are explained in detail with reference to FIGS. 8 to 11. Incidentally, for ease of the explanation, as shown in FIG. 8, the number of input channels is assumed to be two channels in the following explanation.

Specifically, in a simplified expanding unit 109a, a data input unit 202a inputs compressed data for a channel CH1, and a data input unit 202b inputs compressed data for a channel CH2. A buffer 208a stores therein expanded data for the channel CH1, and a buffer 208b stores therein expanded data for the channel CH2.

Figure 9:
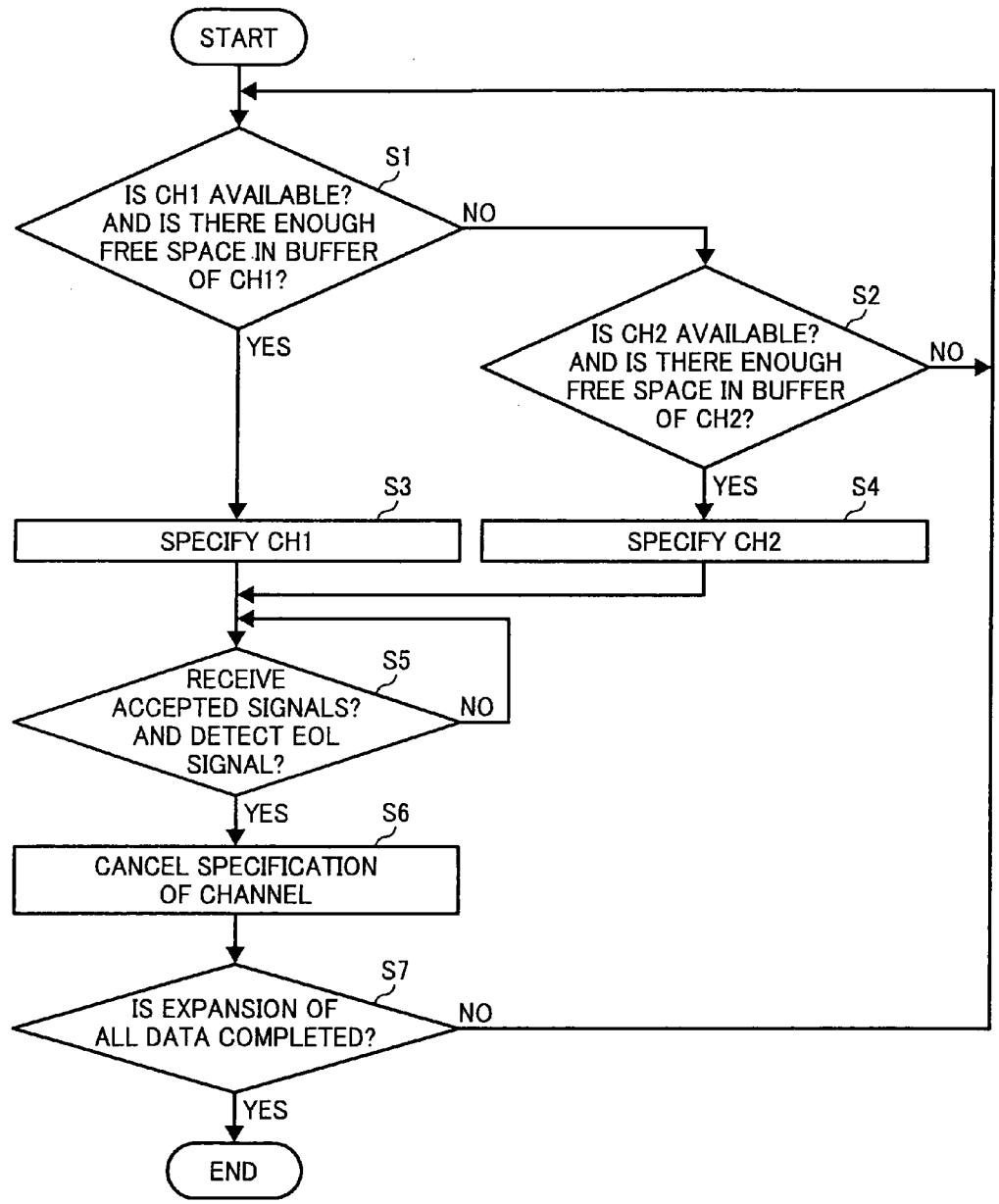
FIG. 9 is a flowchart illustrating the operation of a channel specifying unit.

First, the operation of the channel specifying unit 203 is explained with reference to FIG. 9. As shown in FIG. 9, when the process is started, the channel specifying unit 203 determines whether it is within an available period to expand the compressed data of the channel CH1 and whether the buffer 208a has enough free space to store data in size larger than the unit size of time-sharing expansion (Step S1).

When the determination conditions are not met at Step S1 (NO at Step S1), the channel specifying unit 203 determines whether it is within an available period to expand the compressed data of the channel CH2 and whether the buffer 208b has enough free space to store data in size larger than the unit size of time-sharing expansion (Step S2). Incidentally, whether it is within the available period to expand the compressed data of the channel CH1 or CH2 is determined on the basis of whether the color corresponding to the channel CH1 or CH2 falls under the available period illustrated in FIG. 5.

When the determination conditions are met at Step S1 (YES at Step S1), the channel specifying unit 203 specifies the channel CH1 and sends a signal indicating the specification of the channel to the code analyzing unit 204 and the sorting unit 206 (Step S3). By Step S3, the compressed data input from the data input unit 202a is expanded by the expansion processing unit 205, and the expanded data is stored in the buffer 208a by the sorting unit 206.

When the determination conditions are met at Step S2 (YES at Step S2), the channel specifying unit 203 specifies the channel CH2 and sends a signal indicating the specification of the channel to the code analyzing unit 204 and the sorting unit 206 (Step S4). By Step S4, the compressed data input from the data input unit 202b is expanded by the expansion processing unit 205, and the expanded data is stored in the buffer 208b by the sorting unit 206.

Subsequently, the channel specifying unit 203 determines whether to receive, from the code analyzing unit 204 and the sorting unit 206, acceptance signals indicating that the specification of the channel is accepted, respectively, and whether to detect an output of an EOL signal from the expansion processing unit 205 to the sorting unit 206 (Step S5). The channel specifying unit 203 waits until the determination conditions at Step S5 are met; when the determination conditions at Step S5 are met (YES at Step S5), the channel specifying unit 203 cancels the specification of the channel made at Step S3 or S4 (Step S6).

Therefore, in the expanding unit 109a, when expansion of one block of compressed data for which the channel is specified is completed, the specification of the channel is cancelled, and the expanded data in which the one block of the compressed data is expanded is stored in the buffer 208a or 208b.

Then, the channel specifying unit 203 determines whether expansion of all the compressed data stored in the memory 106 is completed (Step S7); when the expansion is not completed (NO at Step S7), the channel specifying unit 203 returns the process back to Step S1; when the expansion is completed (YES at Step S7), the channel specifying unit 203 terminates the process.

Figure 10:
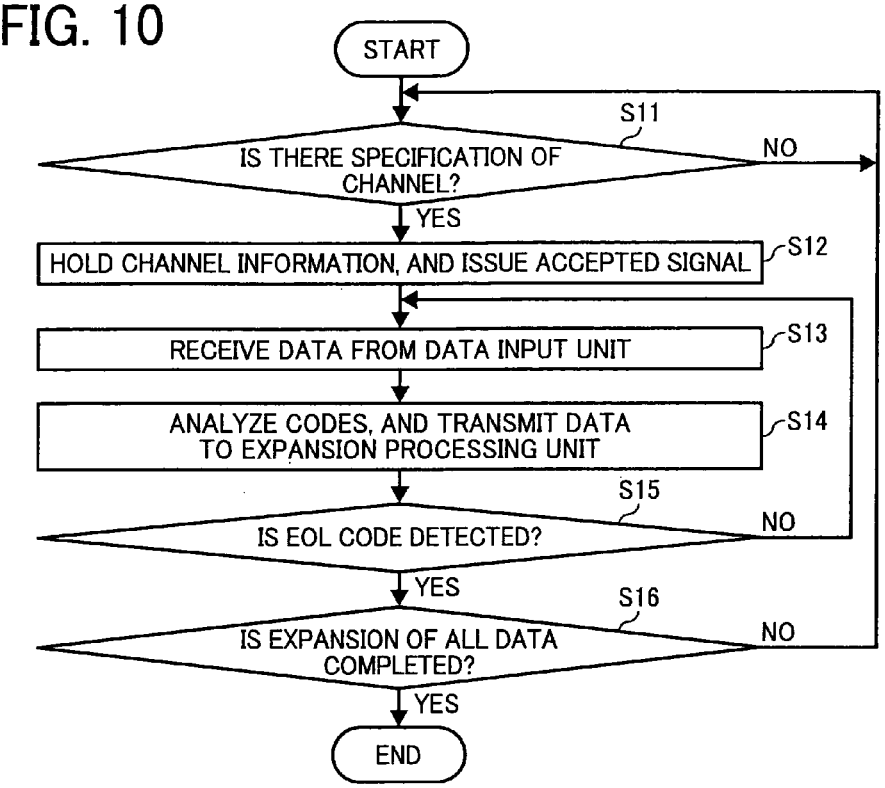
FIG. 10 is a flowchart illustrating the operation of a code analyzing unit.

Subsequently, the operation of the code analyzing unit 204 is explained with reference to FIG. 10. As shown in FIG. 10, when the process is started, the code analyzing unit 204 determines whether specification of a channel is made by the channel specifying unit 203 (Step S11). The code analyzing unit 204 waits until the determination condition at Step S11 is met.

When there is specification of a channel, i.e., the determination condition at Step S11 is met (YES at Step S11), the code analyzing unit 204 holds channel information indicating the specified channel, and issues the acceptance signal indicating that the specification of the channel is accepted, and outputs the acceptance signal to the channel specifying unit 203 (Step S12).

Then, the code analyzing unit 204 receives data from the data input unit corresponding to the specified channel (Step S13), and analyzes codes of the received data and transmits the received data to the expansion processing unit 205 (Step S14). In the analysis of codes at Step S14, detection of an EOL code is performed by the foregoing steps.

Then, the code analyzing unit 204 determines whether to detect an EOL code in the analysis of codes at Step S14 (Step S15). When no EOL code is detected (NO at Step S15), the code analyzing unit 204 returns the process back to Step S13. Therefore, the code analyzing unit 204 continues to transmit the received data to the expansion processing unit 205 until an EOL code is detected from the received data received in accordance with the specified channel.

When an EOL code is detected (YES at Step S15), the code analyzing unit 204 determines whether expansion of all the compressed data stored in the memory 106 is completed (Step S16). When the expansion is not completed (NO at Step S16), the code analyzing unit 204 returns the process back to Step S11; when the expansion is completed (YES at Step S16), the code analyzing unit 204 terminates the process.

Figure 11:
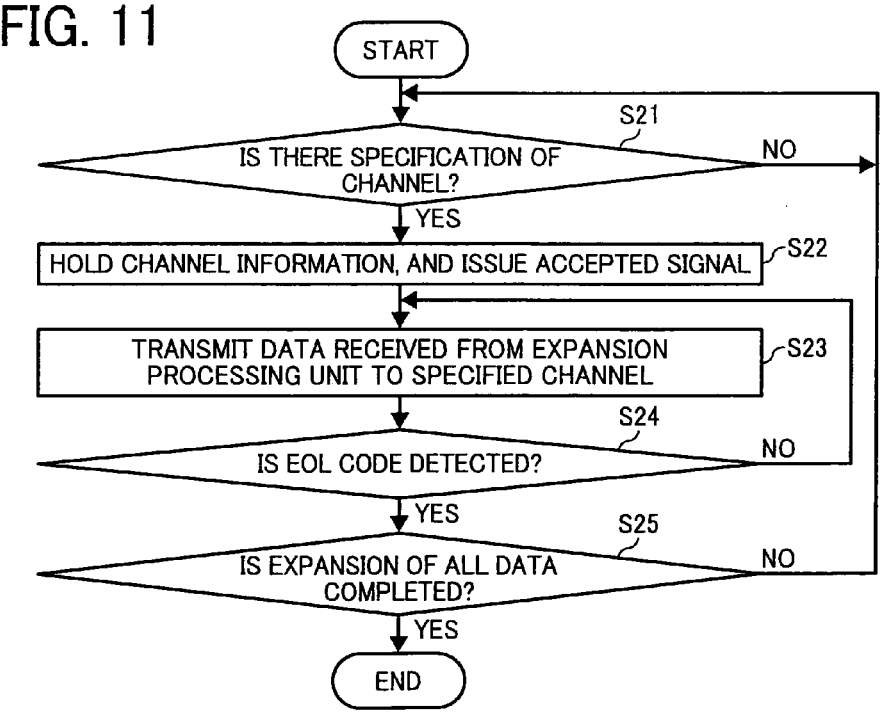
FIG. 11 is a flowchart illustrating the operation of a sorting unit.

Subsequently, the operation of the sorting unit 206 is explained with reference to FIG. 11. As shown in FIG. 11, when the process is started, the sorting unit 206 determines whether specification of a channel is made by the channel specifying unit 203 (Step S21). The sorting unit 206 waits until the determination condition at Step S21 is met.

When there is specification of a channel, i.e., the determination condition at Step S21 is met (YES at Step S21), the sorting unit 206 holds channel information indicating the specified channel, and issues an acceptance signal indicating that the specification of the channel is accepted, and outputs the acceptance signal to the channel specifying unit 203 (Step S22).

Then, the sorting unit 206 transmits expanded data received from the expansion processing unit 205 to a buffer corresponding to the specified channel (Step S23). Then, the sorting unit 206 determines whether an EOL code is detected from the data received from the expansion processing unit 205 (Step S24).

When no EOL signal is detected (NO at Step S24), the sorting unit 206 returns the process back to Step S23. Therefore, the sorting unit 206 continues to store the expanded data received from the expansion processing unit 205 in a buffer corresponding to the specified channel until an EOL signal is detected; when an EOL signal is detected, the sorting unit 206 stops the storage in the buffer corresponding to the specified channel. The sorting unit 206 stops the storage of the expanded data in the buffer in accordance with the detection of the EOL signal; thus, sorting of expanded data at the end of block can be definitely performed.

When an EOL signal is detected (YES at Step S24), the sorting unit 206 determines whether expansion of all the compressed data stored in the memory 106 is completed (Step S25). When the expansion is not completed (NO at Step S25), the sorting unit 206 returns the process back to Step S21; when the expansion is completed (YES at Step S25), the sorting unit 206 terminates the process.

Here, the time-sharing expansion in the expanding unit 109a by the operations of the channel specifying unit 203, the code analyzing unit 204, and the sorting unit 206 is explained with reference to FIG. 8. Steps of the time-sharing expansion in the expanding unit 109a are as follows.

Step 3-1: When the process is started, the channel specifying unit 203 determines a channel to be subjected to expansion. Specifically, when detecting that a buffer of a channel within an available period has free space enough to accumulate expanded data for one block, the channel specifying unit 203 specifies the channel, and transmits a signal indicating the specification of the channel to the code analyzing unit 204. Incidentally, if a plurality of channels meet the condition, internal arbitration is performed to specify one of the channels. More specifically, arbitration is performed so as to preferentially specify a channel whose available period is close to the termination.

Step 3-2: When receiving the signal indicating the specification of the channel, the code analyzing unit 204 issues a request for outputting compressed data to a data input unit of the specified channel, and receives the compressed data.

Step 3-3: The code analyzing unit 204 analyzes codes of the compressed data using the table shown in FIG. 7, and outputs compressed data up to the position where an EOL code is detected to the expansion processing unit 205.

Step 3-4: The expansion processing unit 205 issues an EOL signal when the expansion processing unit 205 detects the EOL code while expanding the input compressed data, and notifies the end of the block.

Step 3-5: The sorting unit 206 transmits the expanded data received from the expansion processing unit 205 to the channel (the buffer) specified by the channel specifying unit 203. Furthermore, when receiving the EOL signal from the expansion processing unit 205, the sorting unit 206 switches to a channel to which the expanded data is to be output at this timing.

Step 3-6: When receiving an acceptance signal for specification of a new channel from the code analyzing unit 204, the channel specifying unit 203 starts specification of a next channel. However, if a channel specified next is identical to a channel being subjected to expansion, expansion of a block is waited, or the channel can be specified if the buffer has free space for two or more blocks.

Here, there are shown examples of input data of the channels CH1 and CH2 and merged data input to the expansion processing unit 205. Specifically, there is shown an example of time-sharing expansion in the order of the channel CH1→the channel CH1→the channel CH2→the channel CH1→the channel CH2→the channel CH2.

Input data of the channel CH1:
code CA→code CB→code CC→EOL (end of block 1)→code CD→code CE→code CF→EOL (end of block 2)→code CG→code CH→EOL (end of block 3)

Input data of the channel CH2:
code CI→code CJ→code CK→code CL→EOL (end of block 1)→code CM→code CN→EOL (end of block 2)→code CO→code CP→EOL (end of block 3)

Merged data input to the expansion processing unit:
code CA→code CB→code CC→EOL (channel CH1: end of block 1)→code CD→code CE→code CF→EOL (channel CH1: end of block 2)→code CI→code CJ→code CK→code CL→EOL (channel CH2: end of block 1)→code CG→code CH→EOL (channel CH1: end of block 3)→code CM→code CN→EOL (channel CH2: end of block 2)→code CO→code CP→EOL (channel CH2: end of block 3)

In the present embodiment, detection of the code CV (EOL) is used for detection of delimiters in compressed data; however, any code can be used as long as the delimit position of each block can be detected by the code. For example, detection of delimiters in compressed data can be performed by detecting a code, such as a line header indicating a mode of each block. More specifically, when a line header is used for detection of delimiters, a part up to just before a line header is set down as one block. In other words, the line header is a start code indicating the start position of block delimiting.

Furthermore, in the present embodiment, an EOL signal is used for detection of delimiters in expanded data; however, as long as completion of expansion with respect to each block in expanded data can be detected, it is not specifically limited to the configuration using an EOL signal. For example, when the size of one block is fixed (including a case where software setting is allowed), the sorting unit 206 can be provided with a counter for detecting the data size (data length) of expanded data, and the channel specifying unit 203 can switch a channel each time expansion for one block is completed. More specifically, the channel specifying unit 203 is notified that the counter of the sorting unit 206 has counted the data size for one block (a predetermined data length). In response to the notification from the sorting unit 206, the channel specifying unit 203 cancels the specification of the channel to the code analyzing unit 204 and the sorting unit 206, and specifies a new channel.

In the time-sharing processing described above, the expanding unit 109a is provided with the buffers 208a and 208b each having a capacity capable of storing expanded data for one block. The specific reason is as follows.

At the time of expansion for the channel CH1, expansion for the channel CH2 cannot be started until expansion for one block size is completed. Furthermore, when an output of expanded data for the channel CH1 stored in the buffer 208a is not performed, expansion of the block for the channel CH1 cannot be completed because the buffer is occupied. In this case, even when an output of expanded data for the channel CH2 stored in the buffer 208b is proceeded, and next expanded data is required, expansion for the channel CH2 cannot be started. Therefore, it is necessary to provide a buffer having an enough capacity to store one-block expanded data. Incidentally, when the block size is different among blocks, it is necessary to provide a buffer in size for a possible largest block.

Incidentally, in the expanding unit 109a, a case of two channels is illustrated; however, it goes without saying that the same is true in a case of three or more multiple channels. Specifically, in a case of multiple channels, for the same reason as the case of two channels, it is necessary to provide a buffer having a capacity capable of storing expanded data for blocks corresponding to the number of channels. For example, as shown in FIG. 6, when the number of channels is four, it is necessary to provide a buffer having an enough capacity to store expanded data for at least three blocks. Furthermore, when the number of channels is n, it is necessary to provide a buffer having a capacity capable of storing expanded data for at least (n−1) blocks.

(Modification)

Subsequently, a modification of the expanding unit is explained with reference to FIG. 12. The components identical to those in the above embodiment are denoted by the same reference numerals, and the description of those components is omitted; in what follows, only different parts are explained.

In an image compression method for a printer used in the image forming apparatus, depending on input image data, the size of the data after being compressed (compressed data) may be larger than that of the data before being compressed (expanded data). Thus, to minimize a volume of data on the memory, as for data of a specific channel, compressed data can be stored in the memory; as for data of the other channels, expanded data can be stored in the memory. In this modification, an expanding unit handling compressed data as well as expanded data is explained.

Incidentally, whether the size of compressed data is larger than that of expanded data can be detected by counting the data size before and after compression. It is assumed that compressed data and expanded data are stored in the memory so as to minimize a volume of the data on the memory on the basis of a result of the detection. Furthermore, it is assumed that whether data stored in the memory is compressed data or expanded data is recorded on a header of the data.

Figure 12:
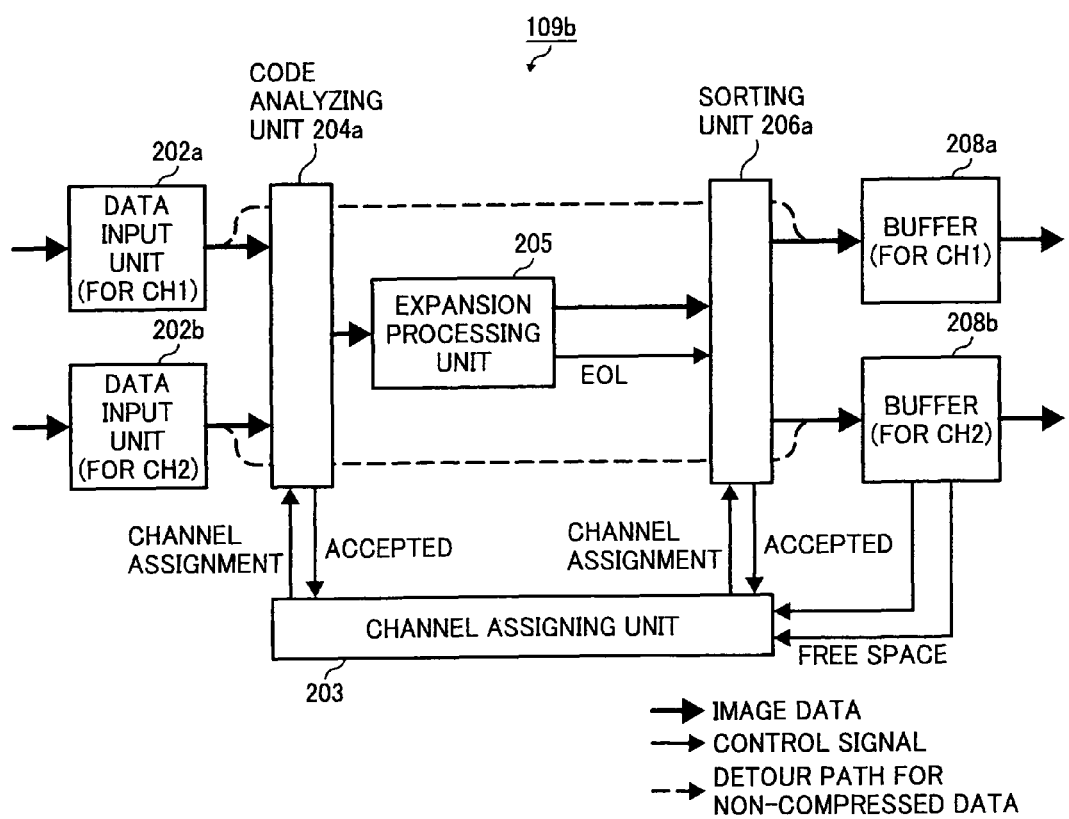
FIG. 12 is a block diagram illustrating an internal configuration of an expanding unit according to a modification.

As shown in FIG. 12, an expanding unit 19b is provided with a detour path for detouring expanded data from a code analyzing unit 204a to a sorting unit 206a without passing through the expansion processing unit 205. The code analyzing unit 204a checks a header of data input from the data input unit, and outputs the data to the expansion processing unit 205 if the data is compressed data, or outputs the data to the sorting unit 206a via the detour path if the data is expanded data. The sorting unit 206a sorts expanded data expanded by the expansion processing unit 205 and expanded data via the detour path so as to be each stored in a buffer corresponding to the input channel. Therefore, when input data is expanded data, the expanding unit 19b can handle an input of the expanded data without performing an expansion process on the expanded data.

Second Embodiment

Figure 13:
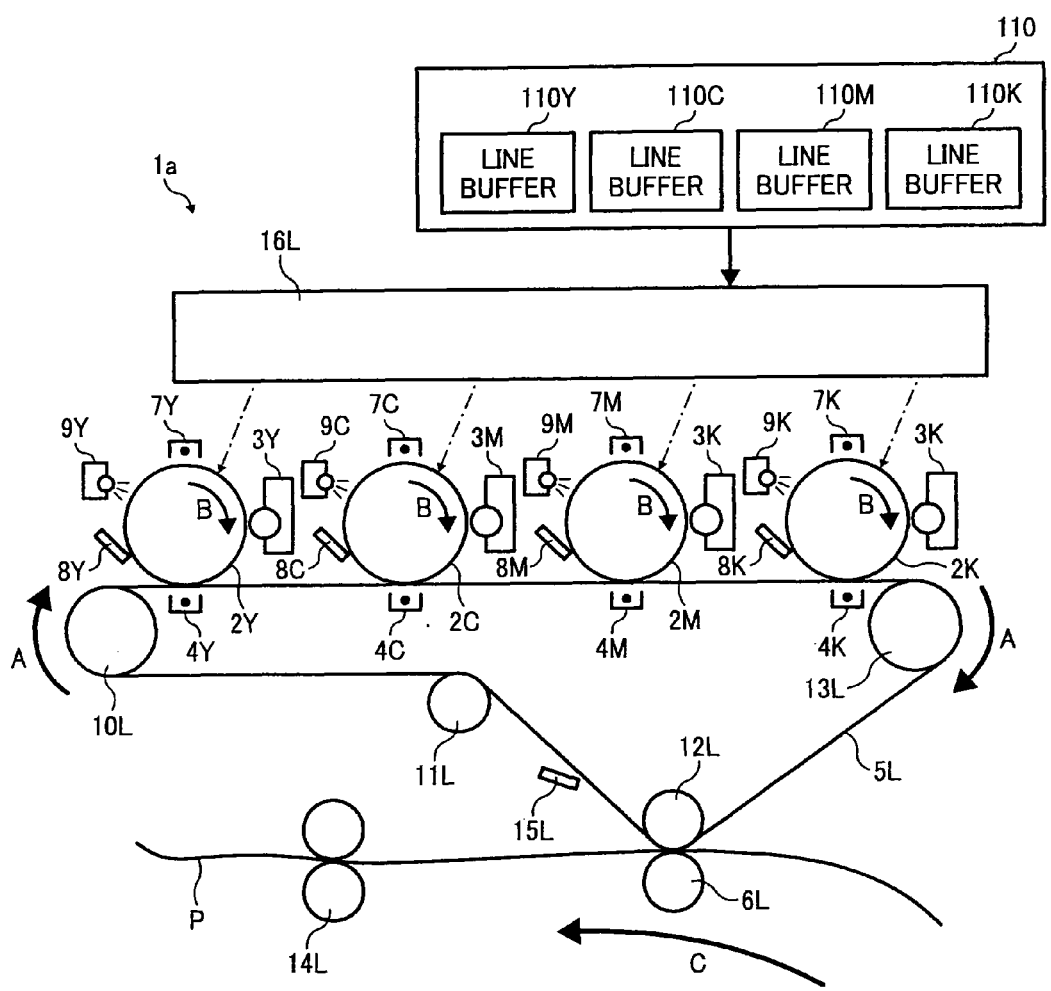
FIG. 13 is a schematic side view for explaining the entire configuration of an image forming apparatus according to a second embodiment.

In a second embodiment, an image forming apparatus that forms a color image on a sheet by the electrophotographic method is illustrated. FIG. 13 is a schematic side view for explaining the entire configuration of an image forming apparatus 1a according to the second embodiment.

As shown in FIG. 13, the image forming apparatus 1a is an electrophotographic tandem-type image forming apparatus, and employs an indirect transfer method; schematically, primary transfer devices 4Y, 4C, 4M, and 4K sequentially transfers toner images, which are formed by developing electrostatic latent images on four photoconductor drums 2Y (yellow), 2C (cyan), 2M (magenta), and 2K (black) as image carriers by developing units 3Y, 3C, 3M, and 3K, onto an intermediate transfer belt 5L as a rotating member, and a secondary transfer device 6L collectively transfers the images on the intermediate transfer belt 5L onto a sheet P as a transferred body.

The intermediate transfer belt 5L is an endless belt, and is supported by a plurality of rollers 10L to 13L. The intermediate transfer belt 5L is driven to move in a moving direction A at a constant speed by a motor (not shown) connected to a shaft of any of the rollers 10L to 13L. An intermediate transfer unit is made up of the intermediate transfer belt 5L and a drive unit of the intermediate transfer belt 5L (the motor, the rollers 10L to 13L, and the like). On the upper side of the intermediate transfer belt 5L, the above-described four photoconductor drums 2Y, 2C, 2M, and 2K for yellow, cyan, magenta, and black colors, respectively, are arranged along the moving direction A to be parallel with one another.

Charging devices 7Y, 7C, 7M, and 7K, the above-described developing units 3Y, 3C, 3M, and 3K, the above-described primary transfer devices 4Y, 4C, 4M, and 4K, cleaning devices 8Y, 8C, 8M, and 8K each made up of a blade, a brush, and the like, and static elimination devices 9Y, 9C, 9M, and 9K are provided around the photoconductor drums 2Y, 2C, 2M, and 2K, respectively.

The primary transfer devices 4Y, 4C, 4M, and 4K are arranged to be opposed to the photoconductor drums 2Y, 2C, 2M, and 2K, respectively, across the intermediate transfer belt 5L. In other words, the intermediate transfer belt 5L moves in a state where the intermediate transfer belt 5L is sandwiched between the primary transfer devices 4Y, 4C, 4M, and 4K and the photoconductor drums 2Y, 2C, 2M, and 2K.

The photoconductor drums 2Y, 2C, 2M, and 2K are driven to rotate in a rotating direction B; at this time, the surfaces of the photoconductor drums 2Y, 2C, 2M, and 2K are charged to a predetermined polarity by the charging devices 7Y, 7C, 7M, and 7K, respectively. Then, the charged surfaces of the photoconductor drums 2Y, 2C, 2M, and 2K are irradiated with laser beams corresponding to image data by an optical-beam scanning device 16L, an optical writing unit with an LD, an LED, an EL, or the like; as a result, electrostatic latent images are formed on the surfaces of the photoconductor drums 2Y, 2C, 2M, and 2K. The image data related to the irradiation of the laser beams is data that is expanded by the expanding unit explained in the first embodiment and output from the image-data output unit 110. The electrostatic latent images formed in this manner are visualized by being developed into Y, C, M, and K toner images by the developing units 3Y, 3C, 3M, and 3K.

The image-data output unit 110 includes line buffers 110Y, 110C, 110M, and 110K for which the optical-beam scanning device 16L irradiates the charged surfaces of the photoconductor drums 2Y, 2C, 2M, and 2K. The line buffers 110Y, 110C, 110M, and 110K are used as a work area for data processing (mirroring, filtering, or the like) and an area for securing a data transfer rate when the optical-beam scanning device 16L irradiates the charged surfaces with laser beams. Furthermore, in the same manner as in the first embodiment, when the line buffers 110Y, 110C, 110M, and 110K each have a capacity capable of storing data in size larger than the unit size of time-sharing expansion by the expanding unit, there is no need to add a buffer required for the time-sharing processing as described above if the line buffers 110Y, 110C, 110M, and 110K are shared between the optical-beam scanning device 16L and the expanding unit.

The developed Y, C, M, and K toner images on the photoconductor drums 2Y, 2C, 2M, and 2K are sequentially transferred onto the surface of the intermediate transfer belt 5L in a superimposed manner by the action of the primary transfer devices 4Y, 4C, 4M, and 4K, and a composite color image in full color is formed.

After toner images remaining on the photoconductor drums 2Y, 2C, 2M, and 2K are cleaned by the cleaning devices 8Y, 8C, 8M, and 8K, static electricity is removed from the photoconductor drums 2Y, 2C, 2M, and 2K by the static elimination devices 9Y, 9C, 9M, and 9K.

The secondary transfer device 6L is arranged to be opposed to the roller 12L across the intermediate transfer belt 5L. A sheet P fed from a sheet feed unit (not shown) is fed in between the roller 12L (the intermediate transfer belt 5L) and the secondary transfer device 6L at a predetermined timing. When the sheet P is fed in between the roller 12L (the intermediate transfer belt 5L) and the secondary transfer device 6L in a sheet conveying direction C, the composite color image carried on the intermediate transfer belt 5L is collectively transferred onto the sheet P by the action of the secondary transfer device 6L.

After that, the composite color image on the sheet P is fixed by the action of heat and pressure by a fixing device 14L, and discharged onto a copy receiving tray (not shown).

Transfer residual toner attached to the surface of the intermediate transfer belt 5L after the composite color image is transferred onto the sheet P is removed by a cleaning device 15L.

As described above, by applying the same expanding unit as the first embodiment to the image forming apparatus 1a that forms a color image on a sheet by the electrophotographic method, image data (compressed data) for respective colors in the image forming apparatus 1a can be expanded in a time-sharing manner.

Second Modification of First Embodiment

Figure 14:
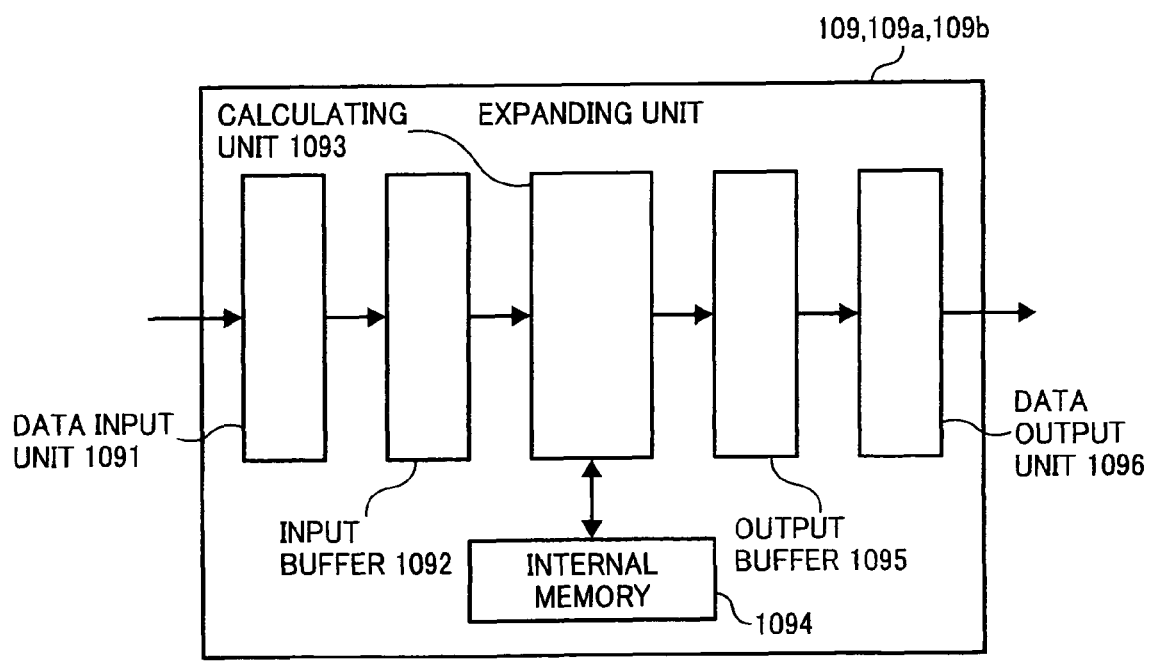
FIG. 14 is a block diagram illustrating an example of the internal configuration of the expanding unit.

Subsequently, a second modification of the first embodiment is explained with reference to FIGS. 14 to 18. FIG. 14 is a block diagram illustrating an example of the internal configuration of the expanding units 109, 109a, and 109b.

As shown in FIG. 14, the expanding units 109, 109a, and 109b include a data input unit 1091, an input buffer 1092, a calculating unit 1093, an internal memory 1094, an output buffer 1095, and a data output unit 1096. Namely, the expanding units 109, 109a, and 109b temporarily accumulate (temporarily stores) a certain amount of data received by the data input unit 1091 in the input buffer 1092. The data accumulated in the input buffer 1092 is output to the calculating unit 1093 using the internal memory 1094 as a work area, processed (expanded) by the calculating unit 1093, and temporarily accumulated in the output buffer 1095 before being output from the data output unit 1096. By such a configuration including the input buffer 1092, even when the data input timing is different from the timing for the calculating unit 1093 to require the data, the data can be transferred efficiently. The same holds true for the output side configuration including the output buffer 1095.

FIG. 15 is an example of a timing chart of the expanding units 109, 109a, and 109b, and specifically, an example of a timing chart according to the first embodiment and the modification of the first embodiment. In FIG. 15, "CH1[N]" denotes data of the N-th block of the channel CH1, and "CH2[M]" denotes data of the M-th block of the channel CH2.

Furthermore, times T1 to T6 denote as follows.

Time T1: Time when expansion (data input) of CH1[N] is started

Time T2: Time when data output of CH1[N] after being subjected to the expansion is started, and thus, the space status of the latter buffer (the output buffer 1095) of the channel CH1 becomes "not available"

Time T3: Time when expansion (data input) of CH2[M] is started

Time T4: Time when the data input of CH2[M] is completed

Time T5: Time when data output of CH1[N] after being subjected to the expansion is completed, and arbitration is implemented Time T6: Time when data in the latter buffer of the channel CH1 is wiped out (is all output), and the space status of the latter buffer becomes "available"

Since data input to the expanding units 109, 109a, and 109b to be expanded is compressed data, the data can be extremely small in size depending on a compression efficiency. Therefore, when the size of input data is comparable to the size of the internal buffers (the input buffer 1092 and the output buffer 1095) of the expanding units 109, 109a, and 109b, as shown in FIG. 15, data input of CH2[M] may be completed (the time T4) before data output of CH1[N] is completed (the time T5). In this case, if arbitration is implemented at the timing when the data output of CH1[N] is completed (the time T5), next data (CH2[M+1]) is input before the space of the latter buffer of the channel CH2 becomes "not available". Since data of CH1[N+1] cannot be output until output of the data of CH2[M+1] is completed, data output is stagnated.

Such stagnation of data output can be prevented by controlling not to implement arbitration until output of whole data in which data for one block is expanded is completed so that the space status of the latter buffer can be detected accurately. Namely, in the second modification, the channel specifying unit 203 specifies a next input channel after waiting until all compressed data temporarily stored in the input buffer 1092 has been expanded by the calculating unit 1093 (corresponding to the expansion processing unit 205) and the expanded data has been output to the output buffer 1095; thus, arbitration is not implemented until output of whole data in which data for one block is expanded is completed.

FIG. 16 is an example of a timing chart of the expanding units 109, 109a, and 109b, and specifically, an example of a timing chart according to the second modification of the first embodiment. The meanings of CH1[N] and CH2[M] in FIG. 16 are the same as those in FIG. 15.

Furthermore, times T11 to T15 denote as follows.

Time T11: Time when expansion (data input) of CH1[N] is started

Time T12: Time when data output of CH1[N] after being subjected to the expansion is started, and thus, the space status of the latter buffer of the channel CH1 becomes "not available"

Time T13: Time when data output of CH1[N] after being subjected to the expansion is completed, and arbitration is implemented, and then the channel CH2 of which the latter buffer has free space is selected Time T14: Time when data output of CH2[M] after being subjected to expansion is started, and thus, the space status of the latter buffer of the channel CH2 becomes "not available"

Time T15: Time when the data output of CH2[M] after being subjected to expansion is completed, and arbitration is implemented, and then the channel CH1 of which the latter buffer has free space is selected In the second modification, the channel specifying unit 203 specifies a next input channel after waiting until data stored in the input buffer 1092 is expanded by the calculating unit 1093 and the expanded data is output to the output buffer 1095; thus, even when input data is extremely small in size (CH2 [M]), next arbitration is not performed until data in which data for block is expanded has been output to the output buffer 1095 (the time T15). Therefore, at the time of arbitration (the time T15), it is possible to detect the space status of the latter buffer accurately. In this case, there is occurrence of overhead, such as occurrence of waiting with each block processing and a long period of time from when data input to the expanding units 109, 109a, and 109b is started till when output of expanded data is started (the time T11 to the time T12, the time T13 to the time T14).

To reduce the overhead, in the second modification, the channel specifying unit 203 specifies a plurality of channels as input channels, and specifies next input channels after waiting until all compressed data temporarily stored in the input buffers corresponding to their respective channels has been expanded.

Figure 17:
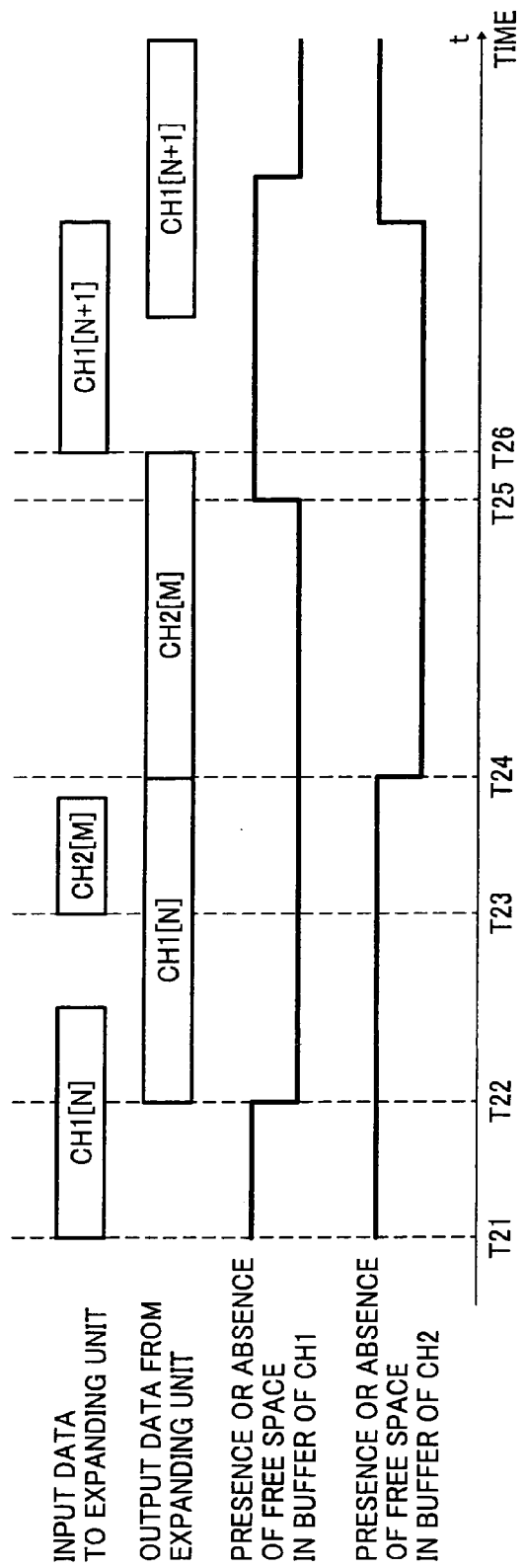
FIG. 17 is a diagram showing still another example of the timing chart of the expanding unit.

FIG. 17 is an example of a timing chart of the expanding units 109, 109a, and 109b, and specifically, an example of a timing chart in a case where a plurality of channels are specified in the second modification. The meanings of CH1[N] and CH2[M] in FIG. 17 are the same as those in FIGS. 15 and 16.

Furthermore, times T21 to T26 denote as follows:

Time T21: Time when arbitration is started. At this time, both the channels CH1 and CH2 of which the space status of the latter buffer is "available" are selected. A code (CH1[N]) of the channel CH1 out of the selected channels CH1 and CH2 is started being input.

Time T22: Time when data output of CH1[N] after being subjected to expansion is started, and thus, the space status of the latter buffer of the channel CH1 becomes "not available"

Time T23: Time when a code (CH2[M]) of the channel CH2 selected in the arbitration at the time T21 is started being input.

Time T24: Time when the data output of CH1[N] after being subjected to expansion is completed. At this time, next arbitration is not implemented.

Time T25: Time when data in the latter buffer of the channel CH1 is wiped out, and the space status of the latter buffer changes to "available"

Time T26: Time when data output of CH2[M] after being subjected to expansion is completed. At this time, expanded data of all the channels selected in the arbitration at the time T21 has been output, and next arbitration is implemented. In the example of FIG. 17, the channel CH1 of which the latter buffer has free space is selected, and a code (CH1[N+1]) of the channel CH1 is started being input.

In the second modification, to reduce the overhead described above, not one channel but all channels of which the latter buffer has free space are specified in one-time arbitration. Incidentally, the processing order of the specified plurality of channels can be determined by another arbitration, or the fixed order can be set. Next arbitration is implemented after waiting until all compressed data temporarily stored in the input buffers 1092 of the channels specified in the arbitration has been expanded by the calculating unit 1093 and the expanded data has been output to the output buffers 1095. Therefore, at the time of arbitration, the space status of the latter buffers of the channels can be detected accurately. Furthermore, it is possible to totally reduce overhead that occurs each time the arbitration is implemented. Specifically, as compared with the case shown in FIG. 16, a time for the overhead is expected to be "1/[the number of channels subjected to expansion at the same time]".

Figure 18:
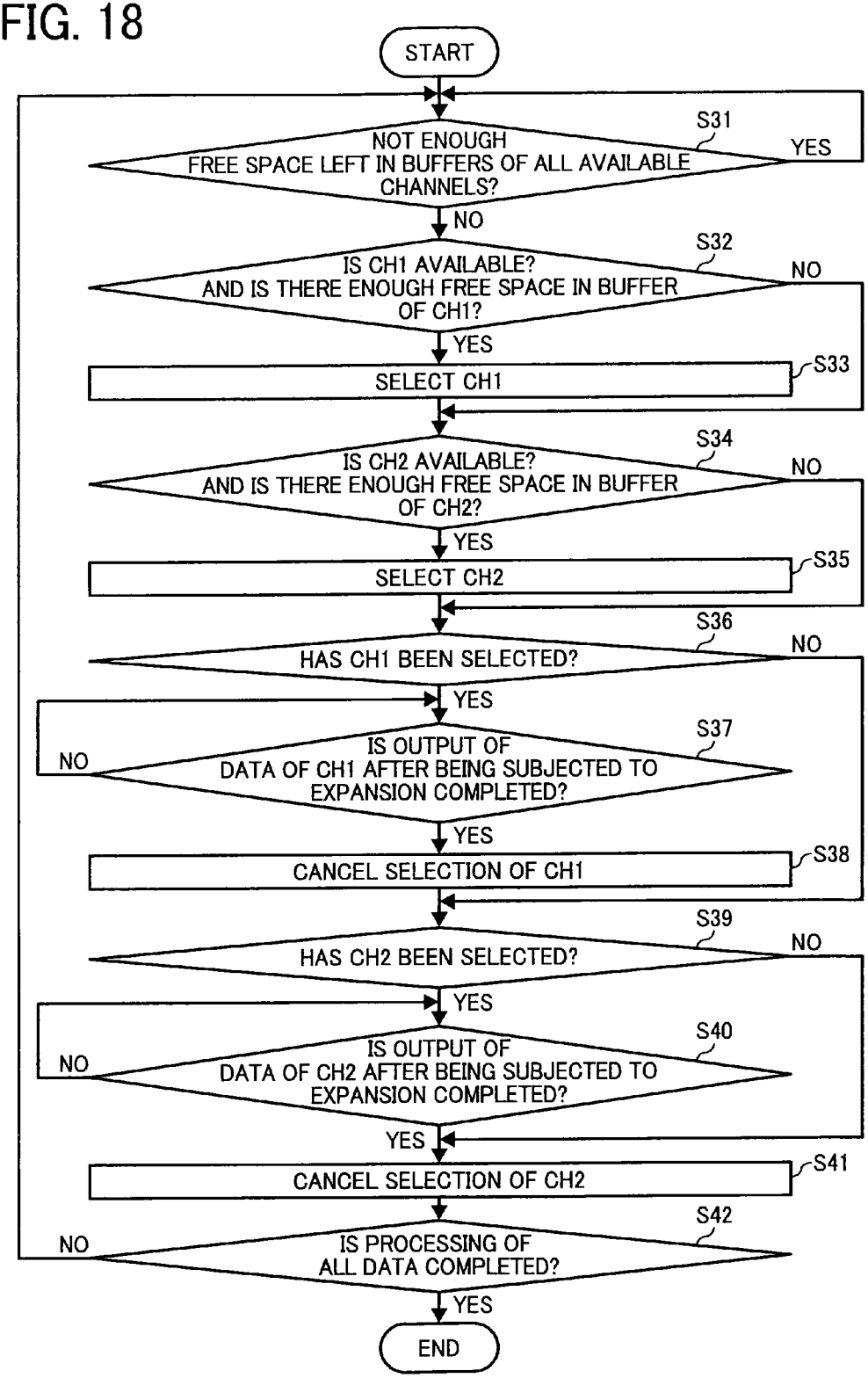
FIG. 18 is a flowchart illustrating the operation of a channel specifying unit according to a second modification.

FIG. 18 is a flowchart illustrating the operation of the channel specifying unit 203 according to the second modification. As shown in FIG. 18, at Steps S31 to S35, a plurality of channels can be selected in one-time arbitration. Furthermore, the flow at Steps S36 to S42 shows that it is waited until codes of all the channels selected in the arbitration have been expanded and output.

Specifically, when the process is started, the channel specifying unit 203 determines whether enough free space is not left in the latter buffers of all available channels (Step S31). When there is not enough free space (NO at Step S31), the channel specifying unit 203 waits the process. When there is enough free space (YES at Step S31), the channel specifying unit 203 advances the process to Step S32.

The channel specifying unit 203 determines whether the channel CH1 is available and whether there is enough free space in the latter buffer of the channel CH1 (Step S32). When it is determined as YES at Step S32, the channel specifying unit 203 selects (specifies) the channel CH1 (Step S33). When it is determined as NO at Step S32, the channel specifying unit 203 advances the process to Step S34 without selecting the channel CH1.

The channel specifying unit 203 determines whether the channel CH2 is available and whether there is enough free space in the latter buffer of the channel CH2 (Step S34). When it is determined as YES at Step S34, the channel specifying unit 203 selects (specifies) the channel CH2 (Step S35). When it is determined as NO at Step S34, the channel specifying unit 203 advances the process to Step S36 without selecting the channel CH2.

The channel specifying unit 203 determines whether the channel CH1 has been selected (Step S36). When t it is determined as NO at Step S36, the channel specifying unit 203 advances the process to Step S39. When it is determined as YES at Step S36, the channel specifying unit 203 determines whether output of data of the channel CH1 after being subjected to expansion is completed, i.e., whether compressed data temporarily stored in the input buffer 1092 of the channel CH1 has been expanded and the expanded data has been output (Step S37). When it is determined as NO at Step S37, the channel specifying unit 203 waits the process; on the other hand, when it is determined as YES at Step S37, the channel specifying unit 203 cancels the selection of the channel CH1 (Step S38), and advances the process to Step S39.

The channel specifying unit 203 determines whether the channel CH2 has been selected (Step S39). When it is determined as NO at Step S39, the channel specifying unit 203 advances the process to Step S41. When it is determined as YES at Step S39, the channel specifying unit 203 determines whether output of data of the channel CH2 after being subjected to expansion is completed, i.e., whether compressed data temporarily stored in the input buffer 1092 of the channel CH2 has been expanded and the expanded data has been output (Step S40). When it is determined as NO at Step S40, the channel specifying unit 203 waits the process; on the other hand, when it is determined as YES at Step S40, the channel specifying unit 203 cancels the selection of the channel CH2 (Step S41), and advances the process to Step S42.

The channel specifying unit 203 determines whether the processing of all the data is completed (Step S42), and when it is determined as YES, the channel specifying unit 203 terminates the process; when it is determined as NO, the channel specifying unit 203 returns the process to Step S31.

Incidentally, in the flowchart described above, the fixed priority order in which it is constantly processed in the order from the channel CH1 when a plurality of channels are simultaneously selected is employed; alternatively, the processing order can be changed depending on the last processed channel, i.e., the input channel last specified by the channel specifying unit 203. For example, when the channel CH1 is specified last, and the process of the channel CH1 is being performed, the channel CH1 is put at the bottom of the priority order (for example, Steps S32 and S33 are put after Steps S34 and S35), so that the inequality in the channels can be alleviated.

Furthermore, in the flowchart described above, a case of two channels is explained; the number of occurrences of overhead is equal to the number of arbitrations, so the more the number of channels operating at the same time (the more the number of channels specified), the more effective it is in reducing the overhead (the more the number of channels operating at the same time, the lower the ratio of the number of arbitrations to "the number of channels times the number of blocks").

Incidentally, the image forming apparatuses in the above embodiments can be applied to any of a multifunction product having at least any two of a copy function, a printer function, a scanner function, and a facsimile function, a printer, a scanner device, a facsimile machine, and the like.

Furthermore, in the above embodiments, there are described examples of the applications of the decoding device according to the present invention to the image forming apparatus 1 that forms a color image on a sheet by the ink-jet method and the image forming apparatus 1a that forms a color image on a sheet by the electrophotographic method; however, an applicable device is not specifically limited to these image forming apparatuses. The decoding device according to the present invention can be applied to any device as long as the device needs to decode compressed data input on a channel-by-channel basis; for example, the decoding device according to the present invention can be also applied to a cellular phone, an image processing apparatus, and the like.

According to the present invention, when compressed data input per channel is expanded in a time-sharing manner, it is possible to reduce a capacity of a channel-by-channel buffer for storing expanded data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A decoding device comprising:
    a plurality of input units corresponding to a plurality of data transmission channels and configured to accept inputs of encoded compressed data through the corresponding data transmission channels;
    a plurality of buffers configured to correspond to the data transmission channels;
    a specifying unit configured to,
        check whether there is free space in each of the plurality of buffers so as to specify a data transmission channel corresponding to a buffer having a free space, and
        cause the input unit corresponding to the specified data transmission channel to accept the input of encoded compressed data;
    a detecting unit configured to,
        analyze codes of the compressed data received from the input unit corresponding to the specified data transmission channels and
        detect a delimit position in the compressed data based on the analysis;
    an expanding unit configured to expand the compressed data based on the delimit position detected by the detecting unit and independently from other inputs of encoded compressed data; and
    a sorting unit configured to sort and store the expanded data into the buffer corresponding to the specified data transmission channel, wherein
    the specifying unit is further configured to, in response to detection of the delimit position, cancel the specified data transmission channel and then specify a next data transmission channel.

2. The decoding device according to claim 1, wherein the detecting unit detects the delimit position on the basis of an end code indicating an end of the compressed data.

3. The decoding device according to claim 2, wherein the sorting unit stops storage in the buffer corresponding to the specified data transmission channel in accordance with an end signal included in the expanded data, the end signal being obtained by expanding the end code.

4. The decoding device according to claim 1, wherein the detecting unit detects the delimit position on a basis of a start code indicating a start of the inputted compressed data.

5. The decoding device according to claim 1, wherein
    each of the input units accepts inputs of the compressed data and expanded data through the corresponding data transmission channel,
    the decoding device further comprises a detouring unit configured to detour the expanded data accepted by the input unit, the detoured expanded data being an output to the sorting unit without passing through the expanding unit, and
    the sorting unit sorts and stores the expanded data expanded by the expanding unit and the expanded data detoured by the detouring unit into the buffer corresponding to the corresponding data transmission channel.

6. The decoding device according to claim 1, further comprising an input buffer configured to temporarily store the compressed data accepted by the input unit corresponding to the specified data transmission channel output the temporarily-stored compressed data to the expanding unit, wherein
    the specifying unit specifies the next data transmission channel after waiting until all the compressed data temporarily stored in the input buffer has been expanded by the expanding unit.

7. The decoding device according to claim 6, wherein the specifying unit specifies a plurality of data transmission channels, as well as a next data transmission channel after waiting until compressed data temporarily stored in the input buffers corresponding to the specified data transmission channels has been all expanded.

8. The decoding device according to claim 7, wherein the specifying unit specifies the plurality of channels in an order depending on the lastly-specified data transmission channel.

9. An image forming apparatus comprising:
a memory for storing a color image to be formed as compressed image data;
the decoding device according to claim 1 for expanding the compressed image data with respect to each color; and
an image forming unit that forms a color image on a sheet, wherein the image forming unit uses the buffers included in the decoding device as color-by-color buffers and forms the color image on the basis of the image data for their respective colors stored in the buffers.

10. The image forming apparatus according to claim 9, wherein the image forming unit forms the color image by an ink-jet method on the basis of the image data for their respective colors stored in the buffers.

11. A decoding device comprising:
a plurality of input units corresponding to a plurality of data transmission channels and configured to accept inputs of encoded compressed data through the corresponding data transmission channels;
a plurality of buffers corresponding to the data transmission channels;
a specifying unit configured to,.
check whether there is free space in each of the buffers so as to specify a data transmission channel corresponding to a buffer having a free space, and
cause the input unit corresponding to the specified data transmission channel to accept the input of encoded compressed data;
a detecting unit configured to detect a delimit position in the compressed data;
an expanding unit configured to expand the compressed data based on the position detected by the detecting unit and independently from other inputs of encoded compressed data;
a counting unit configured to count a data length of the expanded data; and
a sorting unit configured to sort and store the expanded data into the buffer corresponding to the specified data transmission channel, wherein
the specifying unit is further configured to cancel the specified data transmission channel upon the data length counted by the counting unit being a predetermined data length, and then specify a next data transmission channel.

12. The decoding device according to claim 11, further comprising an input buffer configured to temporarily store the compressed data accepted by the input unit corresponding to the specified data transmission channels and output the temporarily-stored compressed data to the expanding unit, wherein
the specifying unit specifies the next data transmission channel after waiting until all the compressed data temporarily stored in the input buffer has been expanded by the expanding unit.

13. The decoding device according to claim 12, wherein the specifying unit specifies the plurality of data transmission channels as well as a next data transmission channel after waiting until compressed data temporarily stored in the input buffers corresponding to the specified data transmission channels has been all expanded.

14. The decoding device according to claim 13, wherein the specifying unit specifies the plurality of channels in the order depending on an lastly-specified data transmission channel.

15. An image forming apparatus comprising:
a memory for storing a color image to be formed as compressed image data;
the decoding device according to claim 11 for expanding the compressed image data with respect to each color; and
an image forming unit that forms a color image on a sheet, wherein the image forming unit uses the buffers included in the decoding device as color-by-color buffers and forms the color image on the basis of the image data for their respective colors stored in the buffers.

16. The image forming apparatus according to claim 15, wherein the image forming unit forms the color image by an ink-jet method on the basis of the image data for their respective colors stored in the buffers.

17. A method of controlling a decoding device including a plurality of input units corresponding to a plurality of data transmission channels and configured to accept inputs of encoded compressed data through corresponding data transmission channels and a plurality of buffers corresponding to the data transmission channels, the method comprising:
checking whether there is free space in each of the plurality of buffers to specify a data transmission channel corresponding to a buffer having a free space;
causing the input unit corresponding to the data transmission channels to accept the input of encoded compressed data;
analyzing codes of the compressed data received from the input unit corresponding to the data transmission channels
detecting a delimit position in the compressed data based on the analyzing;
expanding the compressed data based on the detected delimit position and independently from other inputs of encoded compressed data; and
sorting and storing expanded data into the buffer corresponding to the specified data transmission channel, wherein
at the specifying, in response to detection of the delimit position, the specified data transmission channel is cancelled and a next data transmission channel is specified.

18. The decoding device according to claim 1, wherein
the detecting unit divides the compressed data into delimited data pieces based on the delimit position, and
the expanding unit expands the compressed data received from the detecting unit in a unit of delimited data.

19. The decoding device according to claim 18, wherein
the detecting unit merges the delimited data pieces of the compressed data received from the input unit corresponding to the specified data transmission channel and delimited data pieces of the compressed data received from the input unit corresponding to the next data transmission channel, and
the expanding unit expands merged compressed data received from the detecting unit in a unit of delimited data.

* * * * *